United States Patent
Araki et al.

(10) Patent No.: US 9,321,598 B2
(45) Date of Patent: Apr. 26, 2016

(54) CONVEYOR AND WEIGHT SENSING METHOD USING CONVEYOR

(71) Applicants: ITOH DENKI CO., LTD., Kasai-shi, Hyogo (JP); UNIVERSITY OF HYOGO, Kobe-shi, Hyogo (JP)

(72) Inventors: Nozomu Araki, Himeji (JP); Kazuo Itoh, Kasai (JP); Kazushi Maeda, Kobe (JP)

(73) Assignees: Itoh Denki Co., Ltd. (JP); University of Hyogo (JP)

( * ) Notice: Subject to any disclaimer, the term of this patent is extended or adjusted under 35 U.S.C. 154(b) by 0 days.

(21) Appl. No.: 14/409,068

(22) PCT Filed: Jun. 19, 2013

(86) PCT No.: PCT/JP2013/066878
§ 371 (c)(1),
(2) Date: Dec. 18, 2014

(87) PCT Pub. No.: WO2013/191217
PCT Pub. Date: Dec. 27, 2013

(65) Prior Publication Data
US 2015/0225179 A1     Aug. 13, 2015

(30) Foreign Application Priority Data
Jun. 21, 2012   (JP) .................. 2012-139655

(51) Int. Cl.
*B65G 43/10* (2006.01)
*B65G 43/08* (2006.01)
(Continued)

(52) U.S. Cl.
CPC .............. *B65G 43/08* (2013.01); *B65G 43/10* (2013.01); *G01G 11/12* (2013.01); *B65G 13/06* (2013.01); *B65G 23/08* (2013.01); *H02P 6/04* (2013.01)

(58) Field of Classification Search
CPC .................... B65G 43/08; B65G 43/10
See application file for complete search history.

(56) References Cited

U.S. PATENT DOCUMENTS 4,863,009 A * 9/1989 Winkel .............. B65G 43/10
                                                              177/50
5,228,558 A * 7/1993 Hall ..................... H02P 5/50
                                                              198/571
(Continued)

FOREIGN PATENT DOCUMENTS

EP          1361182 B1    12/2005
GB          736346 A       9/1955
(Continued)

OTHER PUBLICATIONS

Int'l Preliminary Report on Patentability and Written Opinion for PCT/JP2013/066878, mailed Dec. 31, 2014.
(Continued)

*Primary Examiner* — Gene Crawford
*Assistant Examiner* — Thomas Randazzo
(74) *Attorney, Agent, or Firm* — Wood, Phillips, Katz, Clark & Mortimer

(57) ABSTRACT

It is an object of the present invention to provide a conveyor which estimates weight of a transport object while it is carried without using devices such as a load cell which directly measures weight.
The conveyor has a plurality of zones forming a series of carriage ways. An approach-run zone and a weight-measurement zone are arranged adjacently in the conveying direction and are provided with different drive motors. The drive motor of the approach-run zone and the drive motor of the weight-measurement zone are controlled with respectively different predetermined rotation speeds as their target rotation speeds. A rotation speed sensing means obtains the change of rotation speed of the drive motor in the weight-measurement zone when a transport object is conveyed into the weight-measurement zone from the approach-run zone, and a weight sensing means then calculates the weight of the transport object based on the change of the rotation speed.

17 Claims, 15 Drawing Sheets

(51) Int. Cl.
*G01G 11/12* (2006.01)
*H02P 6/04* (2006.01)
*B65G 13/06* (2006.01)
*B65G 23/08* (2006.01)

(56) References Cited

U.S. PATENT DOCUMENTS

| | | | | |
|---|---|---|---|---|
| 6,021,888 A * | 2/2000 | Itoh | ............ | B65G 43/08 198/572 |
| 6,035,999 A * | 3/2000 | Hall | ............ | B65G 13/06 198/781.06 |
| 6,328,154 B1 * | 12/2001 | Huber | ............ | B64D 9/00 198/781.06 |
| 6,378,694 B1 * | 4/2002 | Onoyama | ............ | B65G 39/02 198/781.06 |
| 6,405,851 B1 * | 6/2002 | Takeda | ............ | B65G 43/10 198/575 |
| 6,415,914 B2 * | 7/2002 | Itoh | ............ | B65G 13/06 198/781.06 |
| 6,459,224 B2 * | 10/2002 | Itoh | ............ | B65G 13/075 198/571 |
| 6,820,736 B2 * | 11/2004 | Itoh | ............ | B65G 39/02 198/780 |
| 6,897,625 B2 * | 5/2005 | Brixius | ............ | B65G 47/31 198/571 |
| 8,550,234 B2 * | 10/2013 | Breen | ............ | B65G 43/10 198/460.1 |
| 8,757,363 B2 * | 6/2014 | Combs | ............ | B65G 43/10 198/349 |
| 2003/0209410 A1 | 11/2003 | Itoh | | |

FOREIGN PATENT DOCUMENTS

| | | |
|---|---|---|
| JP | 11-326146 A | 11/1999 |
| JP | 11-326147 A | 11/1999 |
| JP | 2003-250289 A | 9/2003 |
| JP | 2004-26503 A | 1/2004 |
| JP | 2004-026503 A | 1/2004 |
| JP | 2004-028892 A | 1/2004 |
| JP | 2006-105729 | 4/2006 |
| JP | 2006-105729 A | 4/2006 |
| JP | 2010-202403 A | 9/2010 |
| JP | 2012-071988 A | 4/2012 |

OTHER PUBLICATIONS

Supplementary European Search Report, issued Dec. 1, 2015, in EP 13 80 6202.

\* cited by examiner

CONVEYOR AND WEIGHT SENSING METHOD USING CONVEYOR

TECHNICAL FIELD

The present invention relates to a conveyor used in a factory and a physical distribution warehouse. The present invention is particularly recommended to be used for a roller conveyor. Further, the present invention relates to a weight sensing method using a conveyor.

BACKGROUND ART

A conveyor is used widely at a factory and a physical distribution warehouse. The conveyor includes a roller conveyor which carries a transport object by a rotating roller, a roller conveyor which carries a transport object by an end-less belt, and a chain which carries a transport object by bucket and the like attached to the chain.

Patent Documents 1 to 3 and so on are known as a conventional art which relates to a conveyor. Patent Document 1 relates to trouble diagnosis of a conveyor from change in an electric current value of a motor by sensing the electric current value of a drive motor one by one. Patent Document 2 relates to trouble diagnosis of a conveyor from change in a rotation speed of the motor. Patent Document 3 relates to trouble diagnosis by sensing a belt slip with an electric current value in the conveyor belt.

Moreover, Patent Document 4 relates to a device which has a weight measuring part (weighing part) of a transport object, the device inspecting the transport object and automatically correcting a decreased speed of the conveyor, and the decreased speed being estimated from measured weight. Furthermore, Patent Document 4 discloses a technology to increase accuracy of weight measurement using a conveyor, wherein the conveyor has an approach run part provided behind the measuring part (upstream side based on the measuring part in conveying direction) and an object sensing device provided ahead of the approach run part (downstream side based on the approach run part in conveying direction), and wherein the conveyor includes measuring a required time from passing through the approach run part to reaching the object sensing device of the transport object and modifying the result obtained in the weight measuring part by using the required time.

However, these conventional technologies include a trouble diagnosis by a change in the electric current value or a rotation speed, or need to have a weight measuring part (weighing part) as described above.

PATENT DOCUMENT

Patent Document 1: JP 11-326147 A (1999)
Patent Document 2: JP 2012-71988 A
Patent Document 3: JP 11-326146 A (1999)
Patent Document 4: JP 2004-28892 A

SUMMARY OF INVENTION

Technical Problem

As mentioned above, in the background art, it is necessary to provide the weight measuring part (weighing part) for the conveyor to measure the weight of the transport object carried by the conveyor. Further, the weight measuring part (weighing part) requires a load cell or the like which is costly, and also the control involved is complex.

Therefore, in the background art, weight measurement of a transport object using a conveyor raises manufacturing costs due to the extra components such as the load cell, and easily induces troubles due to the complexity of the control.

In the view of the problem of the background art, it is an object of the present invention to provide a conveyor which estimates weight of a transport object while it is carried without using devices such as a load cell which directly measures weight.

Solution to Problem

An aspect of the present invention to solve the above-mentioned problems is a conveyor for forming a series of carriage ways and including: a first zone driven by a motor and a second zone adjacent to the first zone and driven by another motor, the motor of the first zone being controlled so that its rotation speed becomes a constant rotation speed, while the motor of the second zone being controlled so that its rotation speed becomes another constant rotation speed different from that of the first zone, further comprising a rotation speed sensing means to monitor directly or indirectly the rotation speed of either (A) a motor of at least one of the zones or (B) a member that rotates with the motor, and further comprising a weight sensing means to sense weight of a transport object based on fluctuation of the rotation speed of one of the motors when the transport object is moved from one zone to the other zone.

Although the invention is recommended to be applied for a roller conveyor, it is also applicable to another type of conveyor such as a belt conveyor.

In the invention, the term "weight" is not used for a physical meaning but for a conceptual meaning.

Although "weight" as a physical meaning is obtained by multiplying mass by gravity acceleration, "weight" in the invention is not distinguished from "mass".

In the conveyor of the invention, both a motor of the first zone and a motor of the second zone rotate, and a transport object is carried.

On the other hand, the motor of the first zone and the motor of the second zone are controlled in a different rotation speed.

Therefore, when a transport object is moved from one zone to the other zone, the rotation speed of the motor of the destination zone, which is in the downstream side in the carrying direction, changes due to the influence of the inertia put by the speed in the source zone, which is in the upstream side in the carrying direction. However, as for the motor of the destination zone, since the motor is also controlled in a constant rotation speed, the rotation speed of the motor attempts to return to the constant rotation speed again.

For example, when a motor of the source zone is rotating at high speed and a motor of the destination zone is rotating at low speed, overshoot of a rotation speed occurs in the motor of the destination zone due to the inertia of the transport object. Then, the motor of the destination zone attempts to turn back its rotation speed, and at this time the phenomenon that the rotation speed is lower than the original rotation speed occurs. In other words, the motor of the destination zone falls in undershoot condition and the rotation speed decreases temporarily. In this way, the rotation speed of the motor of the destination zone repeats overshoot and undershoot and then gradually approaches the original rotation speed.

According to research by the inventors, it was found that levels or the like of the overshoot and undershoot had a correlation with weight of the transport object and that the weight was sensed by analyzing the overshoot or the like.

The invention based on this knowledge has a weight sensing means to sense weight of a transport object based on fluctuation of the rotation speed of one of the motors when the transport object is moved from one zone to the other zone.

Preferably, weight of the transport object is sensed through the amplitude of the fluctuation of the rotation speed.

According to an experiment by the inventors, it was found that there was a high correlation between the level of the amplitude such as the overshoot and the weight of the transport object. This preferred aspect is based on this knowledge.

Preferably, a low frequency fluctuation of the rotation speed is sensed so that weight of the transport object is sensed through the amplitude in the low frequency fluctuation.

The rotation speed of the motor is easily influenced by various noises and therefore fluctuates rapidly. However, a low frequency fluctuation of the rotation speed is less influenced by noises and represents a correlation with weight of the transport object more clearly. This preferred aspect is based on this knowledge.

Preferably, the amplitude is calculated by approximation of the fluctuation in the rotation speed to a wave having a constant frequency.

According to an experiment by the inventors, the period (frequency) of the overshoot and undershoot was substantially fixed regardless of the weight. Therefore, when the fluctuation in the rotation is approximated in the amplitude wave of the fixed frequency and then the amplitude is calculated, the state of the overshoot and undershoot can be analyzed with easy reappearance. This preferred aspect is based on this knowledge.

Preferably, the approximation is done by Fourier transform.

Preferably, weight of the transport object is sensed through area of a region surrounded by (A) a curve that represents a time history of the rotating speed and (B) a line that represents a target rotation speed or a speed correlated to the target rotation speed.

According to an experiment by the inventors, it was found that there was a high correlation between the area of the region created by the overshoot and so on and weight of the transport object. This preferred aspect is based on this knowledge. The weight sensing based on the area by this aspect may be done individually or together with the weight sensing by the amplitude of the fluctuation.

Preferably, the conveyor is further including a transform relation memory that memorizes relation between the weight of the transport object and the amplitude of the fluctuation of the rotation speed or the area of the region, and wherein the conveyor senses the weight of the transport object, based on (A) an actually sensed value monitored by the rotation speed sensing means when the transport object is moved from one zone to the other zone and (B) the relation memorized in the transform relation memory.

The relation memorized in the transform relation memory may be arithmetic expression or a data table.

Since the conveyor of the preferred aspect senses the weight of the transport object based on the relation memorized in the transform relation memory, the weight is sensed rapidly. For example, even if a control with changing a conveying direction is done based on the weight of the transport object, there is no afraid that carriage efficiency decreases because weight of the transport object is sensed rapidly and exactly.

Preferably, the conveyor is further including a timing sensing means to sense a timing for the transport object to be moved from one zone to the other zone.

According to the preferred aspect, the timing for the transport object to be moved is sensed. Therefore, weight sensing is done more precisely.

Preferably, the motor is a brushless motor having a rotation position sensing means to sense a position of a rotor and wherein the rotation speed sensing means monitors the rotation speed of the motor based on a sensing signal of the rotation position sensing means.

In this preferred aspect, the rotation position sensing means of brush-less motor is used and the rotation speed is monitored. Therefore, there are almost no parts which should be prepared newly as the rotation speed sensing means.

Preferably, the rotation position sensing means includes a plurality of Hall elements provided in the motor, wherein time interval of a position sensing signal of each of the Hall elements is sensed, and wherein the rotation speed of the motor is monitored based on the time interval.

In this preferred aspect, the rotation speed is sensed precisely, and also weight is measured more precisely.

Preferably, difference between a target rotation speed of the first zone and a target rotation speed of the second zone is more than 30% (percent) of a lower target rotation speed of the two target rotation speeds.

Another aspect of the present invention is a weight sensing method using a conveyor and for sensing weight of a transport object mounted on the conveyor, including the steps of: dividing the conveyor into a first zone driven by a motor and a second zone adjacent to the first zone and driven by another motor, controlling the motor of the first zone so that its rotation speed becomes a constant rotation speed, controlling the motor of the second zone so that its rotation speed becomes another constant rotation speed different from that of the first zone, moving the transport object from one zone to the other zone, monitoring fluctuation of the rotation speed of a motor of at least one of the zones during the move, sensing low-frequency fluctuation of the rotation speed, and obtaining weight of the transport object based on amplitude of the low-frequency fluctuation.

According to the aspect, weight is sensed with carrying a transport object.

Preferably, the amplitude is calculated by approximation of the fluctuation in the rotation speed to a wave having a constant frequency.

Preferably, the approximation is done by Fourier transform.

Preferably, the conveyor is further including the steps of: monitoring fluctuation of the rotation speed of the motor so as to obtain a curve that represents a time history of the rotating speed, and obtaining weight of the transport object based on area of a region surrounded by the curve and a line that represents a target rotation speed or a speed correlated to the target rotation speed.

Another aspect of the invention is a weight sensing method using a conveyor and for sensing weight of a transport object mounted on the conveyor, including the steps of: dividing the conveyor into a first zone driven by a motor and a second zone adjacent to the first zone and driven by another motor, controlling the motor of the first zone so that its rotation speed becomes a constant rotation speed, controlling the motor of the second zone so that its rotation speed becomes another constant rotation speed different from that of the first zone, moving the transport object from one zone to the other zone, monitoring fluctuation of the rotation speed of a motor of at least one of the zones during the move so as to obtain a curve that represents a time history of the rotating speed, and obtaining weight of the transport object based on area of a region surrounded by the curve and a line that represents a target rotation speed or a speed correlated to the target rotation speed.

In this aspect, weight of a transport object is sensed with carrying a transport object.

Effects of Invention

The conveyor of the present invention is able to measure weight of a transport object with carrying the transport object. Further, in the conveyor of the invention, special weight measuring devices such as a load cell are not necessary, and only a small number of parts are required.

MODE FOR CARRYING OUT INVENTION

A conveyor 1 in the embodiment of the present invention is described hereinafter.

A conveyor 1 in this embodiment (the first embodiment) adopts a control type referred to as distributed control and is divided in more than one control zone. A transport object is carried toward a zone on downstream side from a zone on upstream side. That is, the conveyor 1 of this embodiment has a carriage function by distributed control.

The conveyor 1 of this embodiment has a weight measurement function which measures weight of a transport object in addition to the above-described carriage function.

First, the carriage function by distributed control and a mechanical composition of the conveyor 1 will be described below.

Figure 1:
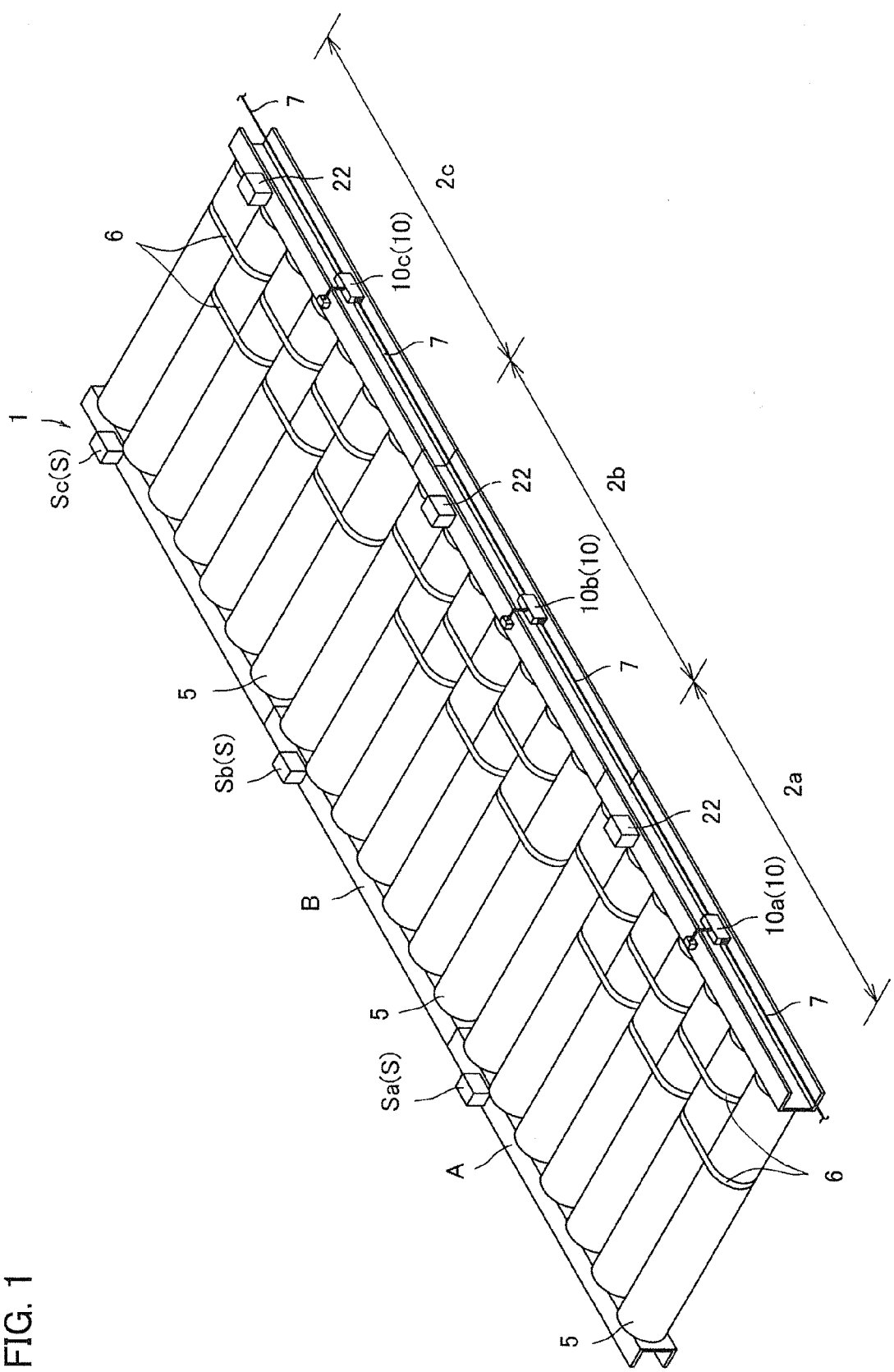
FIG. 1 is a perspective view showing a conveyor according to the first embodiment of the present invention.

As shown in FIG. 1, the conveyor 1 includes a plurality of zone conveyors 2 (2a, 2b, 2c, . . . ) arranged in series in a conveying direction. Each zone conveyor 2 (2a, 2b, 2c, . . . ) is a conveyor which mainly includes carriage rollers 5, a presence sensor S (Sa, Sb, Sc, . . . ) and a zone controller 10 (10a, 10b, 10c, . . . ). Since the zone conveyors 2 (2a, 2b, 2c, 2d . . . ) have the same mechanical configuration and the same size, a structure of the zone conveyor 2b disposed in the center of the figure will be described in detail as a representative example.

Figure 2:
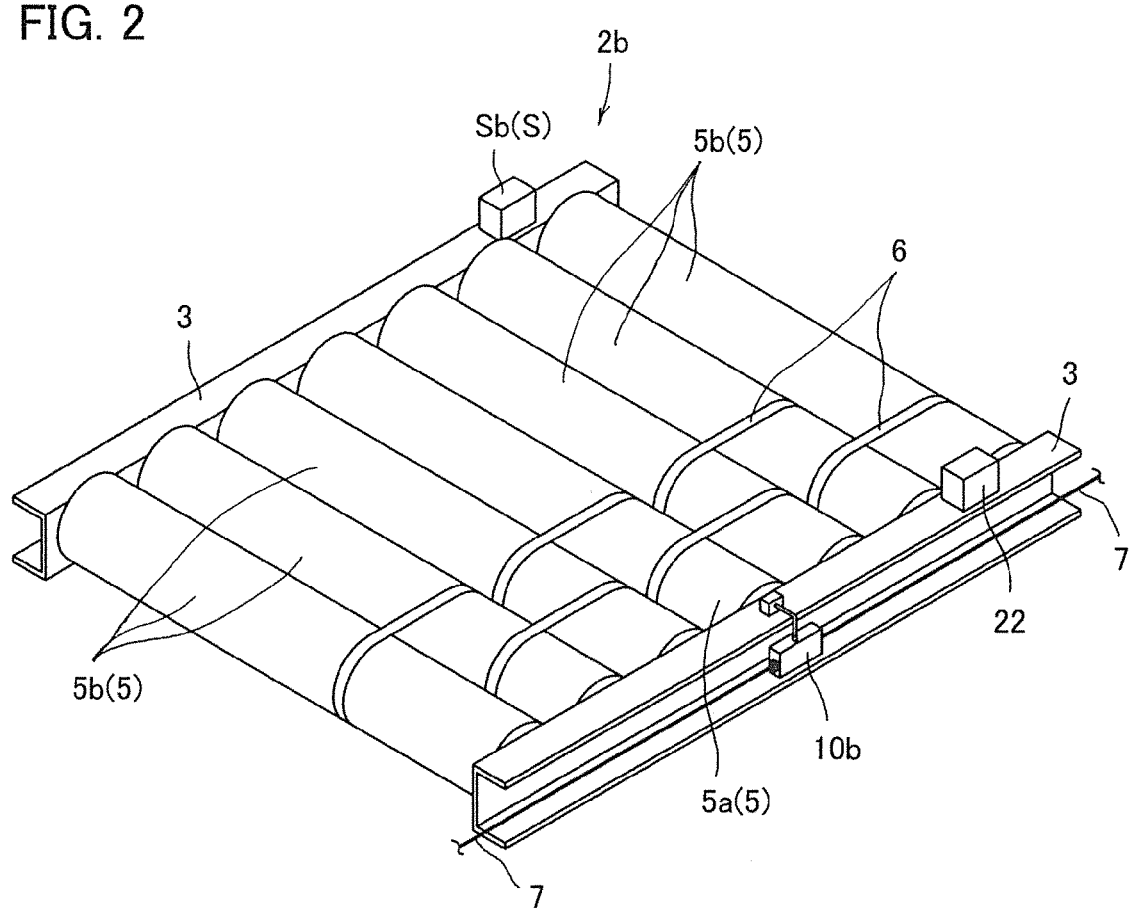
FIG. 2 is a perspective view showing a zone conveyor of the conveyor of FIG. 1.

As shown in FIG. 2, the zone conveyor 2b is a device in which a plurality of carriage rollers 5 for carrying a transport object are axially supported at predetermined interval in the conveying direction between a pair of left and right side frames 3, 3 disposed in parallel. The carriage rollers 5 includes a freely rotatable driven roller 5b and a motor-incorporating roller 5a incorporating a drive motor 12 (not shown in FIG. 2; see FIG. 3). In this embodiment, there is only one motor-incorporating roller 5a, and the remaining six rollers are driven rollers 5b.

Figure 3:
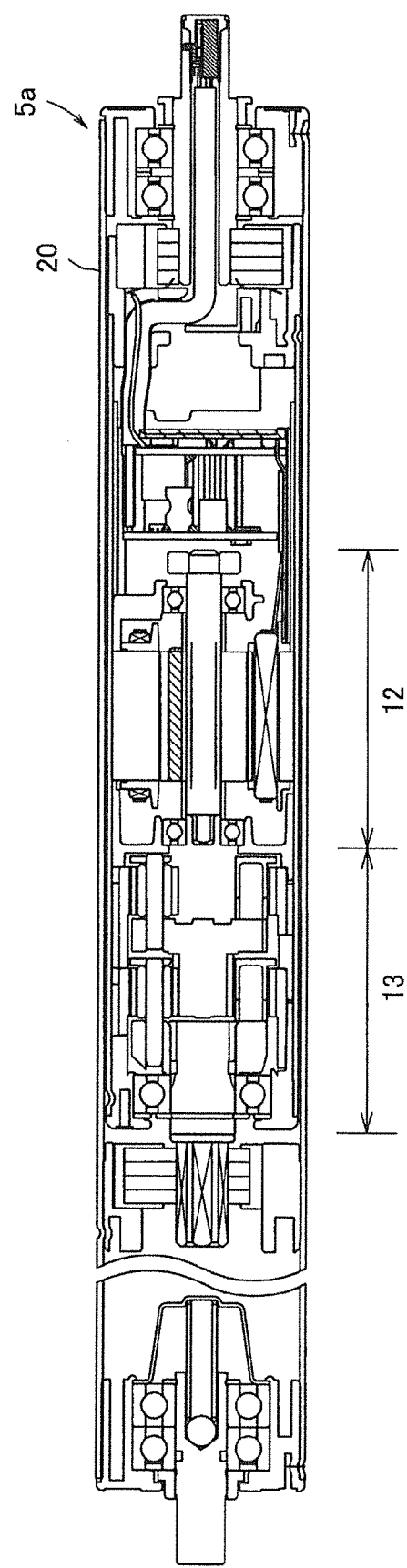
FIG. 3 is a cross sectional view showing a motor-incorporating roller to adopt with the conveyor of FIG. 1.

The motor-incorporating roller 5a has an inside structure for example as shown in FIG. 3. Specifically, the motor-incorporating roller 5a has a roller body 20 incorporating a drive motor 12 and a reducer 13, and rotates by rotation of the drive motor 12.

The motor-incorporating roller 5a in this embodiment has a brushless motor as the drive motor 12 incorporated therein.

Figure 5:
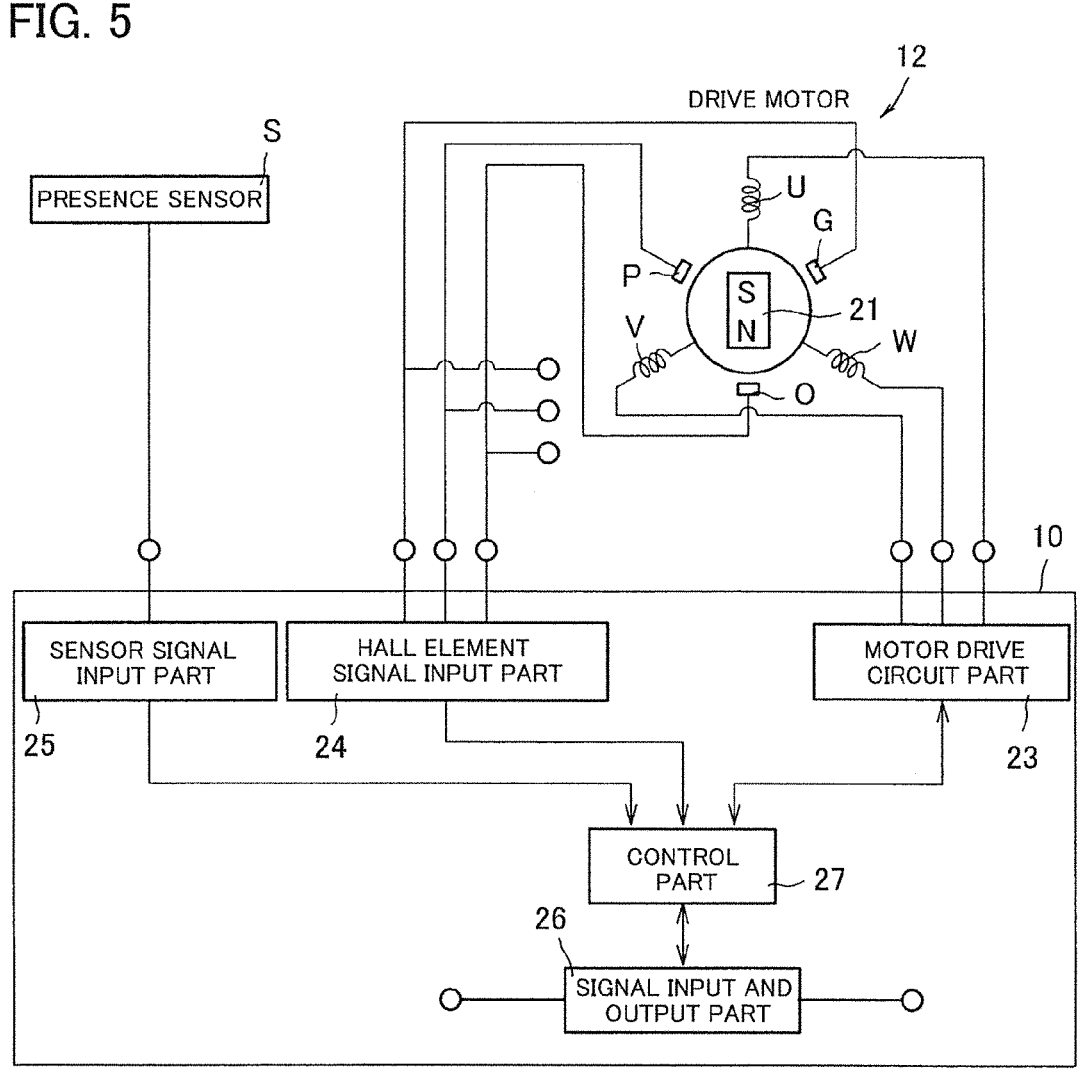
FIG. 5 is a conceptual view showing a relation between the zone controller to adopt with the conveyor of FIG. 1 and a drive motor for the conveyor or a presence sensor.

That is, the drive motor 12 adopted in this embodiment is a brushless motor as shown in FIG. 5, and has a rotor 21 having a permanent magnet and three types of stator coils (U, V, W) surrounding the rotor. Further, the drive motor 12 has three Hall elements P, G, O as a rotation position sensing means to sense a position of the rotor 21.

A transmission belt 6 is wound around two adjacent carriage rollers 5 in the zone conveyor 2b. Therefore, a rotary drive force of the motor-incorporating roller 5a can be transmitted to all the driven rollers 5b. In this embodiment, the motor-incorporating roller 5a is disposed in a center portion.

Further, as shown in FIG. 2, the presence sensor Sb is provided in the zone conveyor 2b. The presence sensor Sb is provided on a side frame 3. The presence sensor Sb is positioned near a downstream end on the conveying direction.

The presence sensor Sb is a photoelectric sensor and has a light emitting element 22 such as a light-emitting diode or an infrared diode on an opposing side frame 3. When a transport object is present, light from the light-emitting element 22 is shielded by the transport object, causing the presence sensor Sb to output an ON (High level) signal; whereas when the transport object is absent, the presence sensor Sb outputs an OFF (Low level) signal. Thus, turning ON/OFF of the photoelectric sensor allows detection of a state where the transport object has been conveyed to a predetermined position.

Figure 4:
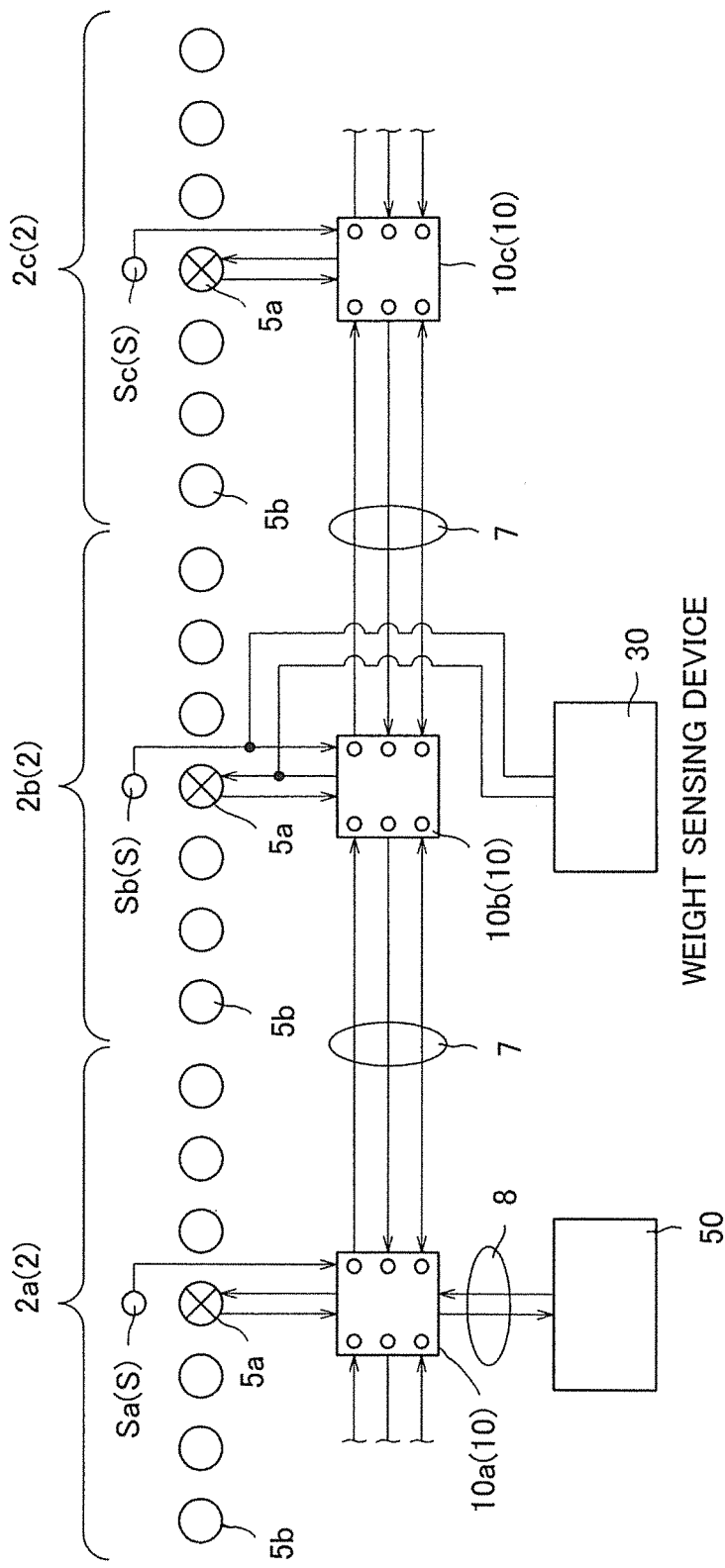
FIG. 4 is an explanatory view showing wiring of the conveyor of FIG. 1.

As shown in FIG. 4, the zone controller 10b for controlling drive of the drive motor 12 (see FIG. 3) incorporated in the motor-incorporating roller 5a is mounted to one of the side frames 3 of the zone conveyor 2b.

Specifically, the zone controller 10b includes a motor drive circuit part 23, a Hall element signal input part 24, a sensor signal input part 25, a signal input and output part 26 and a control part 27.

The motor drive circuit part 23 is a switching circuit to supply current one after another to the rotor coils (U, V, W) of the drive motor 12.

The Hall element signal input part 24 is a circuit into which the signal from the Hall elements P, G, O of the drive motor 12 is inputted.

The control part 27 has a CPU and a memory, both not illustrated, and executes a PWM control, a rotation speed computation and a carriage mode control.

The signal input and output part 26 is a circuit to communicate the adjacent zone controllers 10a, 10c.

As described above, the zone controller 10b controls drive of the drive motor 12 (see FIG. 3). Specifically, the zone controller 10b has a function which rotates the drive motor 12 smoothly, a function which maintains a rotation speed of the drive motor 12 at a constant speed, and a function which starts or stops the drive motor 12.

That is, as described above, the drive motor 12 is a brushless motor, and has a rotor 21 and three Hall elements P, G, O as a rotation position sensing means, the rotor 21 having a permanent magnet and three types of stator coils (U, V, W) surrounding the rotor.

In the zone controller 10b, an electric current is supplied to the stator coils (U, V, W) in response to the position (rotation posture) of the rotor 21 one after another to generate a rotation magnetic field whereby the rotor 21 is made to rotate smoothly. In other words, the zone controller 10b has a function which rotates the drive motor 12 smoothly.

Further, the zone controller 10b according to this embodiment has a function which feeds back a rotation speed of the drive motor 12 and a PWM control function. Therefore a rotation speed of the drive motor 12 is maintained at a constant speed.

Specifically, the zone controller 10 monitors a rotation speed of the drive motor 12 by counting the signal outputted from the Hall elements P, G, O. Then, in the zone controller 10 of this embodiment, the rotation speed of the drive motor 12 is fed back by the Hall elements P, G, O.

A voltage inputted to the stator coils (U, V, W) is changed according to the differences between a target rotation speed and an actual rotation speed of the drive motor 12.

More specifically, the zone controller 10 has a PWM control function whereby the width of the input pulse is increased or decreased according to the differences between a target rotation speed and an actual rotation speed of the drive motor 12. For example, when the actual rotation speed corresponds to the target rotation speed, an electric current is supplied to the stator coils (U, V, W) in 50% of the pulse width. When the actual rotation speed of the drive motor 12 decreases, the pulse width increases with responding to the decrease. As a result, a current quantity to the stator coils (U, V, W) increases to increase torques of the rotor 21 whereby its rotation speed shows an increasing tendency. On the other hand, when the actual rotation speed of the drive motor 12 is greater than the target rotation speed, the pulse width decreases. As a result, the current quantity to the stator coils (U, V, W) decreases to decrease torques of the rotor 21 whereby its rotation speed shows a decreasing tendency.

Therefore, in the drive motor 12 for the conveyor 1, when an actual rotation speed becomes smaller than a target rotation speed, the current quantity to the stator coils (U, V, W) increases to increase the rotation torques of the rotor 21 whereby its rotation speed increases gradually. On the other hand, when an actual rotation speed is greater than a target rotation speed, the current quantity to the stator coils (U, V, W) decreases to decrease the rotation torques of the rotor 21 whereby its rotation speed becomes slow gradually.

As mentioned above, the zone controller 10b has a function which rotates the drive motor 12 smoothly.

The zone controller 10b in this embodiment has a program corresponding to the various carriage modes to start or stop the drive motor 12 according to the carriage mode. For example, in the case that a transport object exists in a zone on the upstream side and no transport objects exist in the own zone, its own drive motor 12 is started. Further, for example, in the case that the transport object has already passed away from the own zone, its own drive motor 12 is stopped.

Although there are various carriage modes, detailed explanation of them is omitted here.

As for the conveyor 1 of this embodiment, a space of the zone controller 10 (10a, . . . 10c, . . . 10n) set up respectively to adjoin in the zone conveyor 2 (2a, 2b, 2c, 2d) is connected with a signal line 7 by mutuality as shown in the FIGS. 1 and 4. At least one of the zone controllers 10 (10a . . . 10n), which is the zone conveyor 2a in this embodiment, is connected to an supervisory control device 50 via a signal line 8. In this embodiment, as shown in FIG. 4, all the signals inputted to the supervisory control device 50 are not inputted through the zone controller 10. As shown in FIG. 5, the signal outputted from the Hall elements G, O, P of the drive motor 12 is inputted directly to the supervisory control device 50 not through the zone controller 10.

As shown in the arrow of FIG. 4, as for the zone controller 10 of this embodiment (zone controller 10b), the following signals are inputted to the zone controller 10b through a signal input and output part 26: a presence signal of the zone controller 10 (zone controller 10a) which adjoins the upstream side in the conveying direction of the transport object, a presence signal of the zone controller 10 (zone controller 10c) which adjoins the downstream side, and a drive condition signal of the zone on the downstream side.

The presence signal and the drive condition signal outputted from the zone controller 10b are transmitted to other zone controllers 10a, 10c through the signal input and output part 26.

Here, the presence signal is a sensing signal of the presence sensors Sa to Sc (see FIGS. 1 and 4)

In the conveyor 1 of this embodiment, each zone controller 10 is able to refer to a presence signal of the upstream side, a presence signal of the downstream side, and a drive condition signal on the downstream side.

Moreover, an order signal from the supervisory control device 50 is transmitted to the predetermined zone controller 10 (zone controller 10a) through the signal line 8, and furthermore, is transmitted to all the zone controllers 10 which compose the conveyor 1 from the predetermined zone controller 10 (zone controller 10a) (referred in FIG. 4).

Then, each zone controller 10 exchanges information including ON/OFF conditions of the presence sensor S of an adjacent zone and as to whether the drive motor 12 of the adjacent zone starts or not.

Then, for example, in the case that a transport object exists in its own zone and no transport objects exist in a zone on the downstream side, the drive motor 12 of its own zone is started, and the transport object is sent to the zone on the downstream side.

In the conveyor 1 of this embodiment, a weight sensing device 30, which is characterized in this embodiment, is connected to the central zone conveyor 2b.

Figure 6:
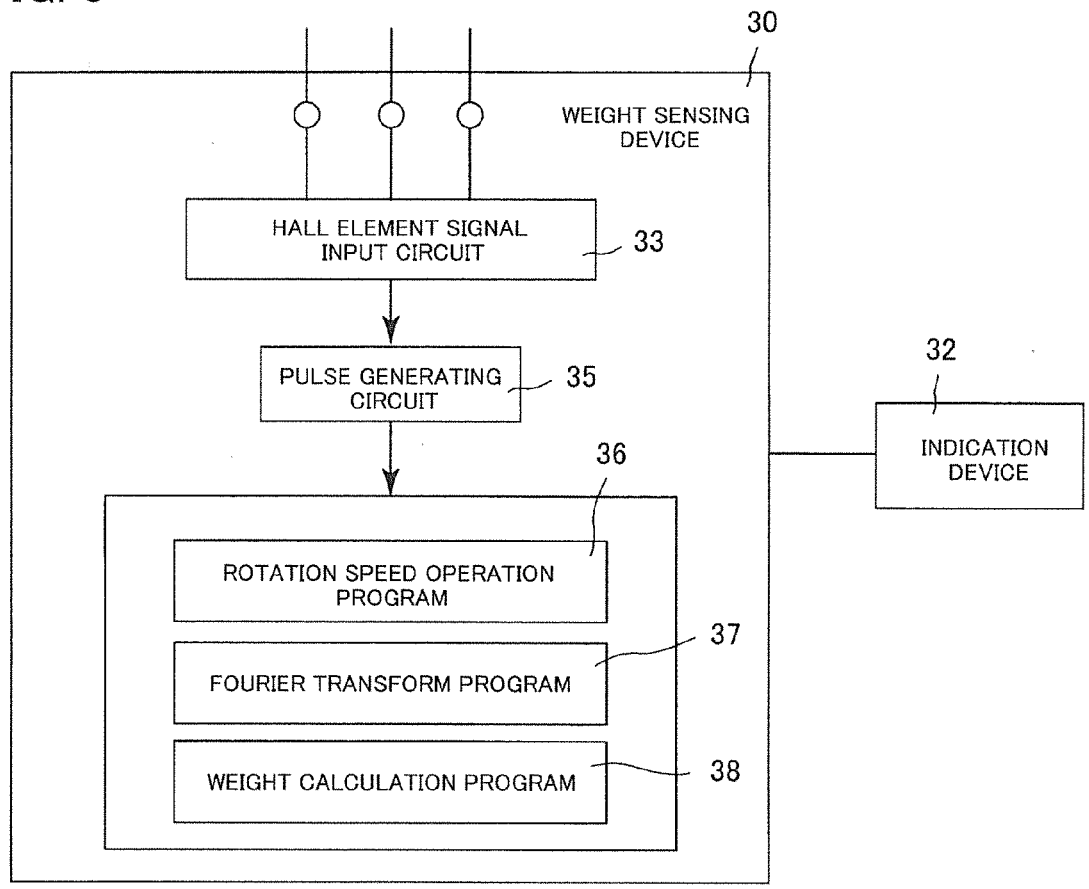
FIG. 6 is a conceptual view showing a weight sensing device to adopt with the conveyor of FIG. 1.

Below, a structure and a function of the weight sensing device 30 as shown in FIG. 6 will be described.

The weight sensing device 30 has a Hall element signal input circuit (rotation speed sensing means) 33 and a pulse generating circuit (rotation speed sensing means) 35. The weight sensing device 30 further has a not illustrated CPU and a memory, and includes a rotation speed operation program (rotation speed sensing means) 36, a Fourier transform program 37 and a weight operation program 38.

The rotation speed operation program 36 calculates the number of rotation of the drive motor 12 based on a signal of the Hall elements P, G, O, the signal being inputted from the Hall element signal input circuit 33.

Here, in this embodiment, the rotation speed operation program 36 of the weight sensing device 30 is independent from the way and the system of calculating the rotation speed of the zone controller 10b aforementioned.

That is, the rotation speed operation program 36 of the weight sensing device 30 senses the time interval of the position sensing signal of each Hall element P, G, O, and the rotation speed of the motor is calculated by the time interval concerned.

Specifically, the time interval of the sensing signal is that of the sensing signal generated from the same pole of the rotor 21. Since the rotor 21 is a bipolar rotor, the time interval of two sensing signals is measured in accordance with the number of poles.

More specifically, the rotor 21 adopted in the drive motor 12 in this embodiment is a permanent magnet having an N pole and an S pole. When the rotor 21 rotates by one rotation, the N pole and the S pole pass through the adjacency of each Hall element P, G, O respectively once. Therefore, when the rotor 21 rotates by one rotation, electric power is generated respectively twice from each Hall element P, G, O.

Further, in the weight sensing device 30 adopted in this embodiment, the electric power is inputted to the Hall element signal input circuit 33, and is changed into a pulse signal by the pulse formation circuit 35.

Figure 7:
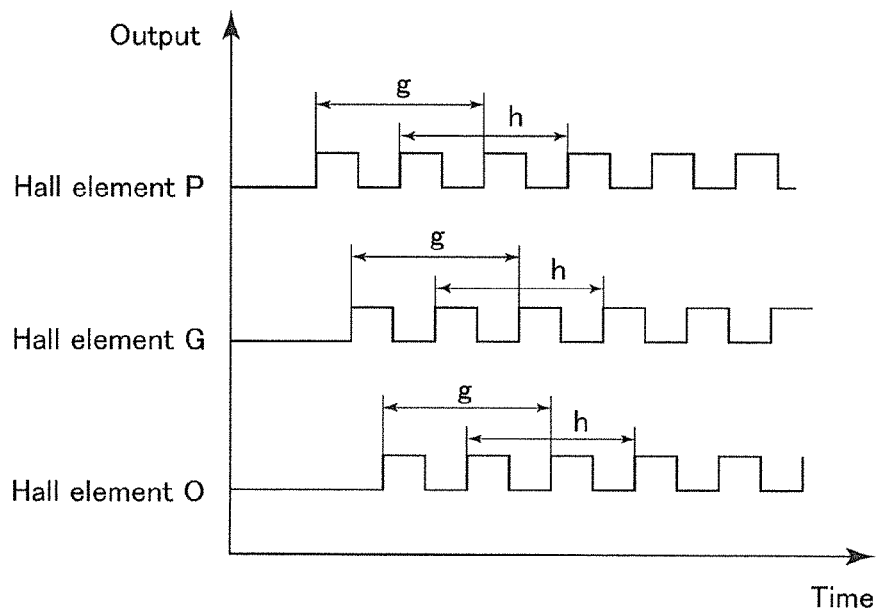
FIG. 7 is an explanatory view showing a movement of a rotation speed calculation part of the weight sensing device of FIG. 6.

Then, as for the rotation speed operation program 36, as shown in FIG. 7, the time interval for two pulses of the signals from each Hall element P, G, O is sensed by using a rising time of the pulse signal as a standard point. More specifically, as shown in FIG. 7, the difference "g" between the first pulse at the rising time and the third pulse at the rising time is found. Similarly, the difference "h" between the second pulse at the rising time and the fourth pulse at the rising time is found.

As described above, since the rotor 21 is a bipolar rotor which has an N pole and an S pole in this embodiment, the first pulse and the third pulse are derived from the same pole of the rotor 21, and the second pulse and the fourth pulse are derived from the same pole of the rotor 21. Thus, an error in the installation position of the Hall elements P, G, O and an error in the position of the poles of the rotor 21 are cancelled.

In this embodiment, the time interval of the pulse between two pulses is measured in each Hall element P, G, O respectively in accordance with the polarity of the rotor 21, and the number of rotation of the drive motor 12 is calculated from their average value.

The Fourier transform program 37 is a program for monitoring a fluctuation in the number of rotation of the drive motor 12 to give a fluctuation curve, and extracting a low frequency component by subjecting the fluctuation curve to Fourier transform. For example, a component of 1 Hz is extracted from the fluctuation curve of the rotation speed of the motor. The selection of the frequency to be extracted will be described hereinafter.

The weight operation program 38 is a program which calculates amplitude from the curve obtained by the Fourier transform and calculates weight of the transport object from the calculated amplitude. The weight operation program 38 selects a weight value corresponding to the amplitude based on a specific arithmetic expression or a reference table (data table).

Figure 10:
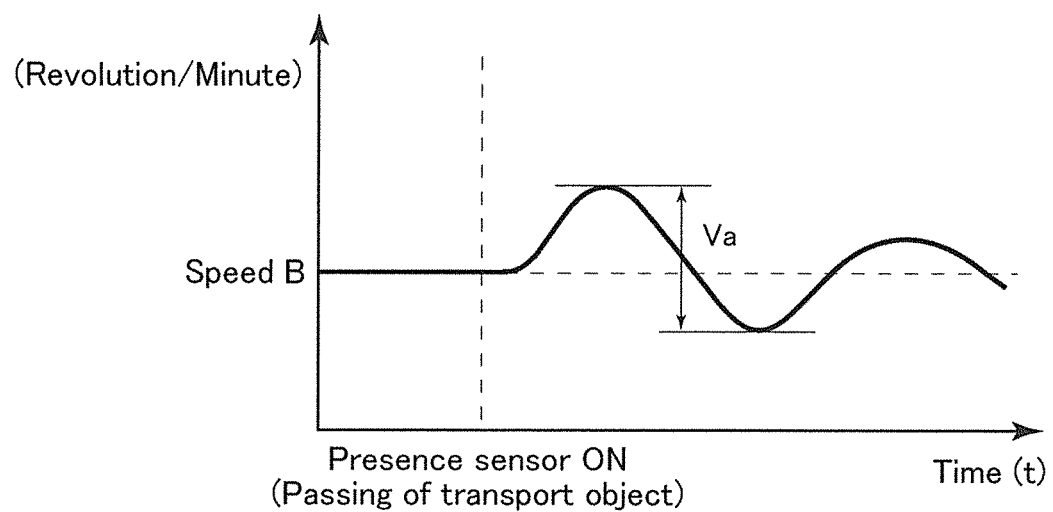
FIG. 10 is a graph showing a change pattern of a rotation speed of the drive motor of the conveyor for the weight measurement.

For example, if a curve after Fourier transform is as shown in FIG. 10, a fluctuation Va which is an amplitude of the maximum value and the minimum value (total amplitude) is calculated, and then a weight value corresponding to the total amplitude Va is specified.

Further, the weight sensing device 30 is connected to an indication device 32 which indicates the specified weight value.

As mentioned above, in the conveyor 1 of this embodiment, the weight sensing device 30, which is characterized in this embodiment, is connected to the central zone conveyor 2b, and the weight of the transport object can be sensed by the weight sensing device 30 during the carriage.

Below, a movement to sense the weight will be described.

In the conveyor 1 of this embodiment, a zone conveyor (zone conveyor in zone A) 2a is made to function as a conveyor for the approach run, and a zone conveyor (zone conveyor in zone B) 2b is made to function as a conveyor for the weight measurement. In the following, the zone conveyor in zone A is referred to as "approach-run conveyor A", and the zone conveyor in zone B is referred to as "weight-measurement conveyor B" (FIG. 1).

When weight of the transport object is measured, a speed of the approach-run conveyor A is made different from a speed of the weight-measurement conveyor B. In other words, the difference is given to a target rotation speed of the motor which drives the approach-run conveyor A and a target rotation speed of the motor which drives the weight-measurement conveyor B.

Figure 8:
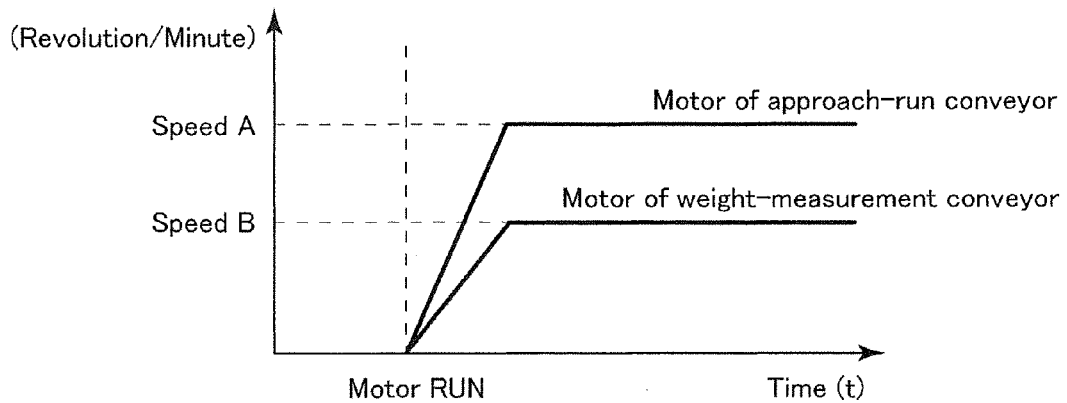
FIG. 8 is a graph showing a rotation speed of the drive motor for the conveyor of FIG. 1 for the approach run and a rotation speed of the drive motor for the conveyor of FIG. 1 for the weight measurement.

In this embodiment, as shown in FIG. 8, the motor of the approach-run conveyor A runs in high-speed rotation (speed A), and the weight-measurement conveyor B runs in low-speed rotation (speed B)

On the low speed side as a standard, the difference in rotation is preferably more than 30%, and is more preferably more than 40%.

In this embodiment, the target rotation speed of the motor of the approach-run conveyor A is made 4556 revolutions per minute, and the target rotation speed of the motor of the weight-measurement conveyor B is made 3106 revolutions per minute. The differences between the speeds are 1450 revolutions, which correspond to 47% of the rotation speed of the weight-measurement conveyor B.

As described above, the zone controller 10 has a function which feeds back a rotation speed of the drive motor 12 and a PWM control function, and can therefore keep the rotation speed of the drive motor 12 constant. Therefore, under the load-less condition, the motor of the approach-run conveyor A rotates at 4556 revolutions per minute which is a target rotation speed, and the weight-measurement conveyor B rotates at 3106 revolutions per minute.

Further, when a rapid load is added or a load change occurs, the number of rotation of the motor changes but gradually approaches the target rotation speed with time progress.

When weight of a transport object is measured, the transport object is carried from the upstream side as shown in FIG. 9. The transport object reaches the approach-run conveyor A as shown in FIG. 9A, and then is carried on the downstream side by the approach-run conveyor A.

Figure 9A:
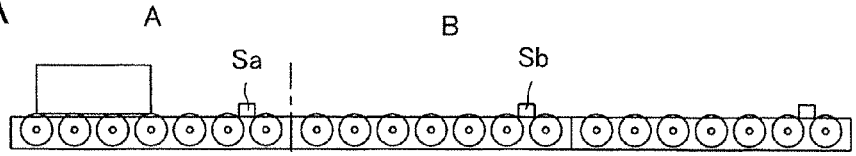
FIGS. 9A to 9D show a position of a transport object on the conveyor of FIG. 1.
Figure 9B:
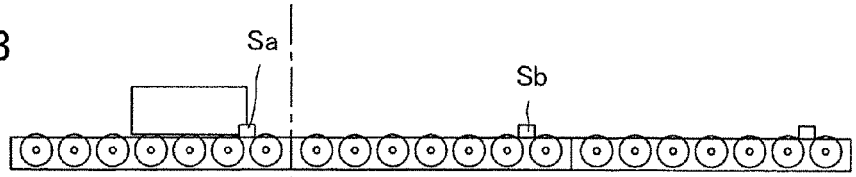

On the way, the transport object is sensed by the presence sensor Sa of the approach-run conveyor A (FIG. 9B). Further, after being sensed with the presence sensor Sa as FIG. 9C, the transport object passes away the sensing area of the presence sensor Sa as FIG. 9D and moves to the weight-measurement conveyor B side.

Figure 9C:
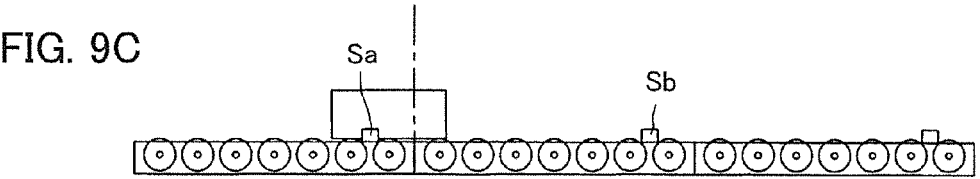
Figure 9D:
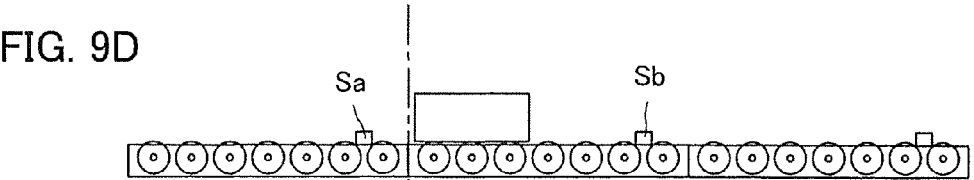
Figure 9E:
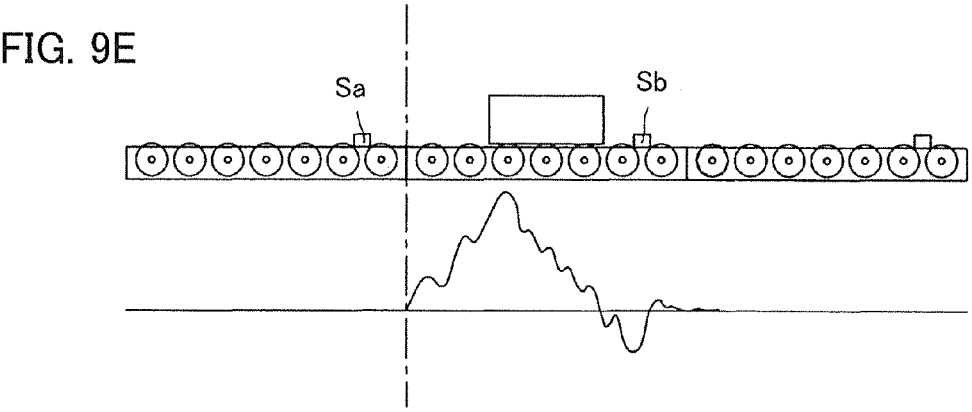
FIG. 9E is a graph showing a rotation speed of the drive motor for the conveyor for the weight measurement.

Then, as shown in FIG. 9E, the transport object moves on the weight-measurement conveyor B. At this time, since the motor of the conveyor A rotates at 4556 revolutions per minute, the transport object moves at a speed in equivalent to 4556 revolutions per minute on the approach-run conveyor A. Then, due to inertia, the transport object rushes into the weight-measurement conveyor B on the downstream side at a speed in equivalent to 4556 revolutions per minute.

At the same time, in the conveyor 1 of this embodiment, as shown in the graph in the bottom of FIG. 9, the number of rotation of the drive motor 12 of the weight-measurement conveyor B is being monitored. The correlation between the number of rotation of the drive motor 12 of the weight-measurement conveyor B and the position of the transport object will be described below.

While a transport object is on the approach-run conveyor A as shown in FIGS. 9A, 9B and 9C, no load is applied to the weight-measurement conveyor B and therefore the weight-measurement conveyor B rotates at 3106 revolutions per minutes as a target rotation speed. Next, the transport object moves to the weight-measurement conveyor B side as shown in FIG. 9D and further reaches the position as shown in FIG. 9E. Then, the weight-measurement conveyor B is subjected to an external force caused by an inertia force of the transport object, and the number of rotation of the motor of the weight-measurement conveyor B shows an increasing tendency. However, since the zone controller 10 has a function which feeds back a rotation speed of the drive motor 12 and a PWM control function, the rotation speed increases not uniformly but totally with repeated up-and-down motions.

When the rotation speed reaches a peak, it shows a decreasing tendency. As described above, the zone controller 10 has a function which feeds back a rotation speed of the drive motor 12 and a PWM control function. When the number of rotation of the drive motor 12 increases, the feedback function acts to decrease an electric current which is supplied to the drive motor 12. Then, a torque of the rotor 21 decreases whereby the rotation speed of the motor of the weight-measurement conveyor B shows a decreasing tendency.

Also, in the case of decreasing the rotation speed, the rotation speed not uniformly but totally decreases with repeated up-and-down motions.

As a result, the rotation speed decreases to a speed lower than 3106 revolutions per minutes as a target rotation speed.

In this embodiment, a series of the rotation speed changes in the drive motor 12 is monitored. Then, the change curve is subjected to Fourier transform by the weight operation program 38 to extract a component of 1 Hz.

Then, an amplitude (total amplitude) Va is obtained from the rotation speed change curve after Fourier transform as shown in FIG. 9, and a weight value corresponding to the amplitude is specified. Further, the specified value is indicated on the indication device 32.

Figure 11:
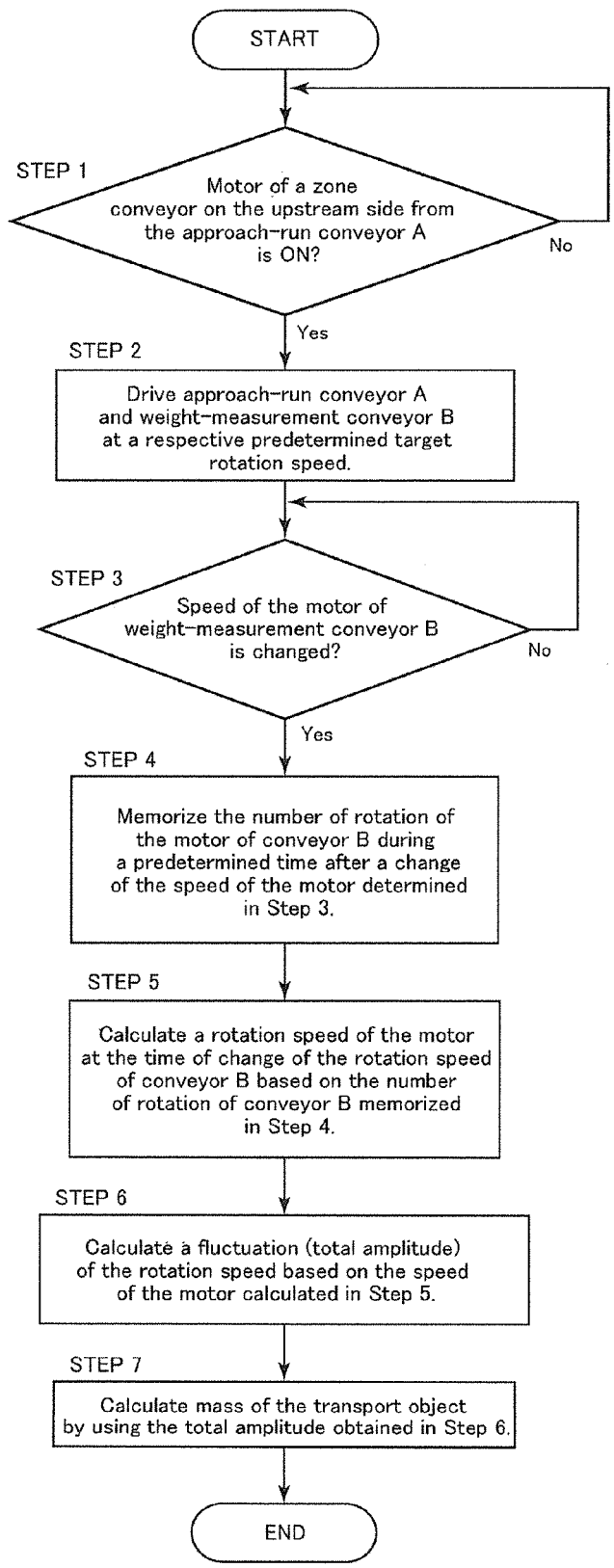
FIG. 11 is a flow chart showing operations of the weight measurement device according to the first embodiment.

FIG. 11 illustrates a flow chart showing the series of flows mentioned above.

In the step 1, it is determined whether a transport object is being carried to a zone conveyor on the upstream side from the approach-run conveyor A. (Hereinafter, the conveyor is referred to as "upstream side conveyor".) Specifically, it is determined whether the drive motor 12 for the upstream side conveyor is being driven (i.e. whether the power is on). After the drive condition of the drive motor 12 of the upstream side conveyor is determined, the control proceeds to the step 2 which drives each of the drive motors 12 for the approach-run conveyor A and the weight-measurement conveyor B at a respective predetermined target rotation speed. Specifically, in the step 2, 4556 revolutions per minute is applied to the target rotation speed of the drive motor 12a of the approach-run conveyor A, and 3106 revolutions per minute is applied to the target rotation speed of the drive motor 12b of the weight-measurement conveyor B.

When the drive motors 12 for the approach-run conveyor A and the weight-measurement conveyor B start driving, the control proceeds to the step 3 which monitors a speed of the drive motor 12b of the weight-measurement conveyor B. Specifically, in the step 3, it is determined from the behavior of the drive motor 12b whether the transport object is conveyed to the weight-measurement conveyor B. Further, it is determined from the conveyance of the transport object whether the speed of the drive motor 12b of the weight-measurement conveyor B is changed. When a change of the speed of the drive motor 12b is determined in the step 3, the number of rotation of the drive motor 12b is memorized during a predetermined time from the time point of the change in a rotation speed (1 second in this embodiment) in the step 4.

When the number of rotation of the drive motor 12b during the predetermined time is memorized in the step 4, a rotation speed of the drive motor 12b is calculated based on the number of rotation (step 5). Specifically, in the step 5, an actual speed of the drive motor 12b at the time of change of the rotation speed is calculated by the rotation speed operation program 36. Further, a graph showing a relation between the rotation speed and the time is prepared by using the actual rotation speed, and the graph is subjected to Fourier transform by the Fourier transform program 37.

Next, the control proceeds to the step 6 which calculates a fluctuation (total amplitude) Va between the maximum value and the minimum value of the rotation speed of the drive motor 12b based on the graph subjected to Fourier transform and showing a relation between the rotation speed and the time. In the step 7, weight of the transport object is calculated by using total amplitude Va of the rotation speed of the drive motor 12b, which is obtained in the step 6. Specifically, in the step 7, weight of the transport object is calculated based on the after-mentioned relation (1) and the Va of the rotation speed of the drive motor 12b.

Weight of the transport object is calculated by the above flow.

Figure 12:
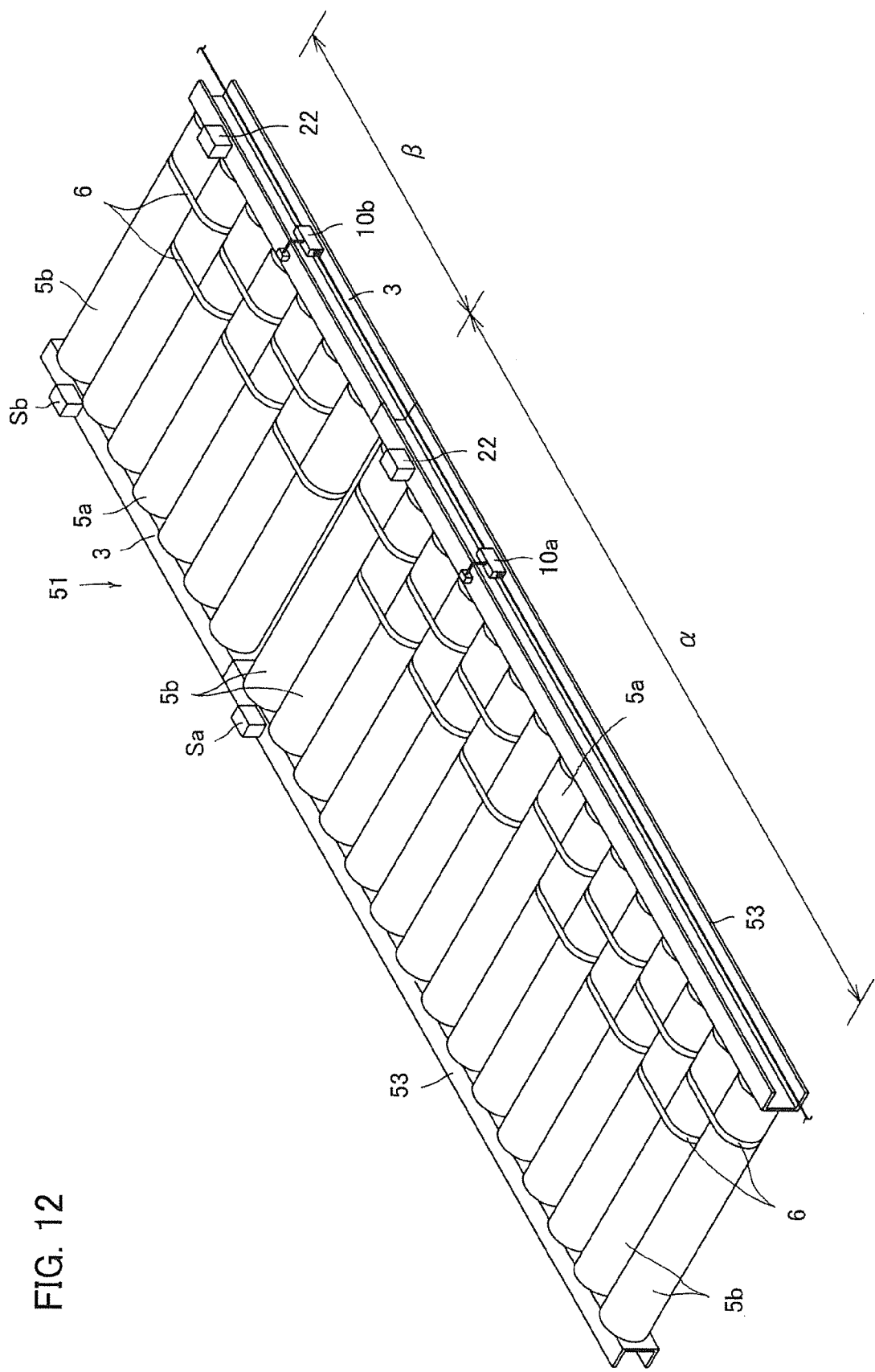
FIG. 12 is a conceptual view showing a conveyor used in Examples of the present invention.

In the embodiment described above, the length of the approach-run conveyor A and that of the weight-measurement conveyor B are made equal. However, from the viewpoint that the speed of a transport object to rush into the weight-measurement conveyor B is made constant, it is preferable that the length of the approach-run conveyor A is larger than that of the weight-measurement conveyor B as shown in FIG. 12.

A conveyor according to this type will be described in detail in the following Examples.

In the embodiment described above, the speed of the approach-run conveyor A is made greater than that of the weight-measurement conveyor B. However, the magnitude relation of the speeds may be opposite in the present invention. That is, the speed of the approach-run conveyor A may be made smaller than that of the weight-measurement conveyor B. In this case, the speed of the motor of conveyor B once decreases and then shows an increasing tendency (see FIG. 15 after-mentioned).

Further, weight of the transport object may be calculated based on a change of rotation speeds obtained by monitoring the number of rotation of motors of both conveyors.

Further, weight of the transport object may be calculated based on a change of rotation speeds obtained by monitoring the number of rotation of motors of conveyor A instead of conveyor B.

In the embodiment described above, weight of the transport object is calculated by using the Va between the maximum value and the minimum value of the rotation speed, the Va being calculated based on the change curve of the motor of the weight-measurement conveyor B. However, in the present invention, amplitude at the maximum side or minimum side may be used to calculate the weight.

In the embodiment described above (the first embodiment), weight of a transport object is sensed based on amplitude of the rotation speed change of the motor. On the other hand, in another embodiment described below (the second embodiment), weight of a transport object is sensed based on area of a region obtained from a change curve of a change of speed of the motor (a curve representing a time history of the rotation speed). The second embodiment will be described below.

For example, in the same way as the first embodiment, 4556 revolutions per minute is applied to the target rotation speed of the drive motor of the approach-run conveyor A (speed A), and 3106 revolutions per minute is applied to the target rotation speed of the drive motor of the weight-measurement conveyor B (speed B). Next, the number of rotation of the drive motor 12 of the weight-measurement conveyor B is monitored to obtain the change curve of the rotation speed of the motor as shown in the bottom of FIG. 9 and in FIG. 13. Specifically, a curve which represents a time history of the rotation speed is drawn with the number of rotation of the motor as the vertical axis and time as the horizontal axis.

Next, a straight line (standard line) which represents the target rotation speed of the weight-measurement conveyor B (i.e. 3106 revolutions per minute) is drawn. Specifically, as shown in FIG. 13, a straight line is drawn at the position of 3106 revolutions per minute (speed B).

Figure 13:
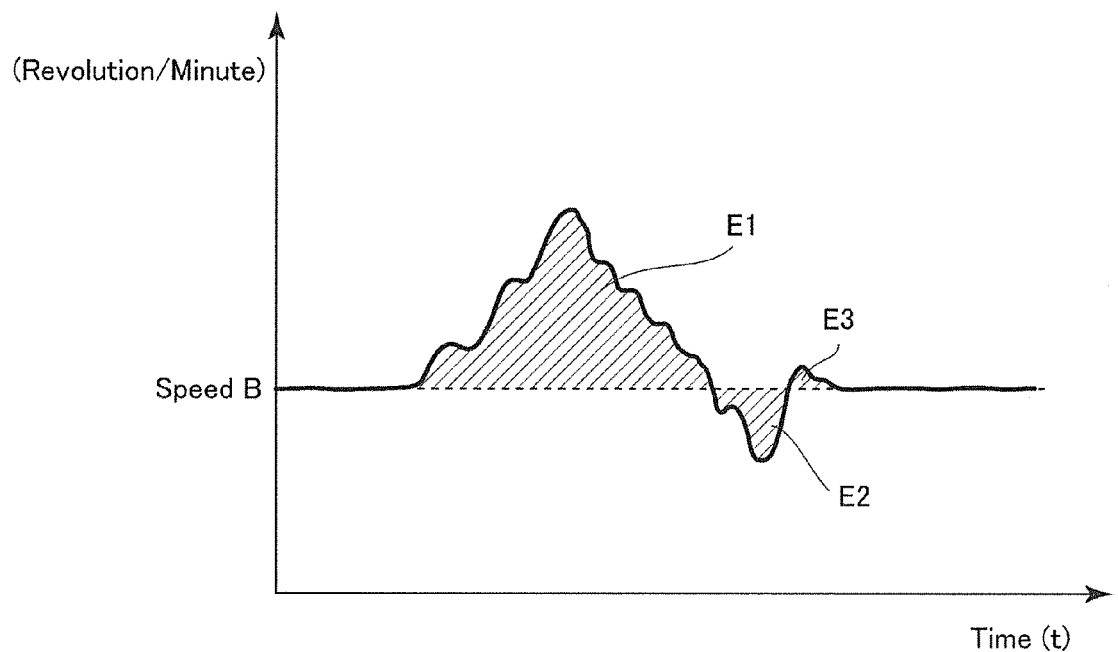
FIG. 13 is a graph showing a change curve of a rotation speed.

Next, regions surrounded by the change curve and the standard line, which are shown by hatching in FIG. 13, are specified to calculate "area E" which is the sum of each area (E1, E2, E3, . . . .) of the regions. Then, weight of the transport object is calculated from the area E.

A series of flows in this embodiment is basically the same as that shown in FIG. 11. However, in the step 6, the area E is calculated based on the actual rotation speed calculated in the step 5. Then, in the step 7, weight of the transport object is calculated by using the area E.

The above-mentioned standard line may be a line representing the target rotation speed itself. Further, the standard line may be a line representing "a speed correlated to the target rotation speed". For example, the speed correlated to the target rotation speed includes a value obtained from the target rotation speed by which a predetermined factor is multiplied, the target rotation speed to which a predetermined factor is added, and the target rotation speed from which a predetermined factor is subtracted.

Figure 14:
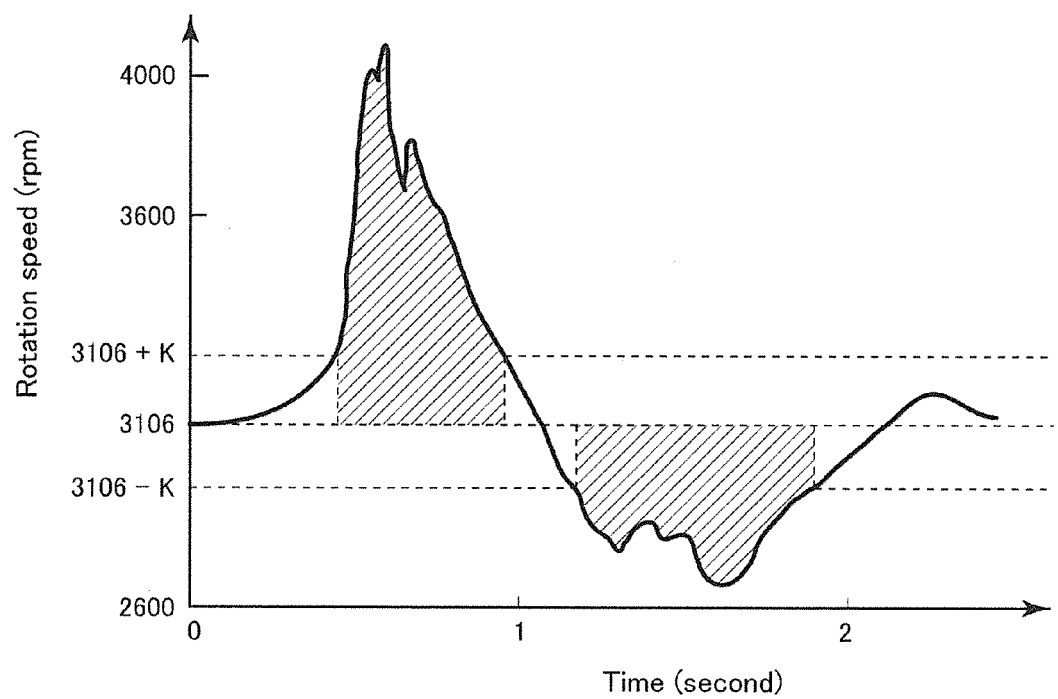
FIG. 14 is a graph showing an example of a change curve of a rotation speed and a standard line in the second embodiment.

In this embodiment, a modified area E may be used instead of the area E itself. For example, modification of ignoring a change of the rotation speed may be done in a specific range based on the target rotation speed. For example, in the case that the change curve as shown in FIG. 14 is obtained, the change of rotation speed may be ignored as to the specific range of the target rotation speed (3106 revolutions per minute) plus/minus K (e.g. K=170 rpm) to adopt the area of the regions shown by the hatching in FIG. 14.

As for the other structure in the second embodiment, an explanation is omitted because it is the same as the first embodiment.

Figure 15:
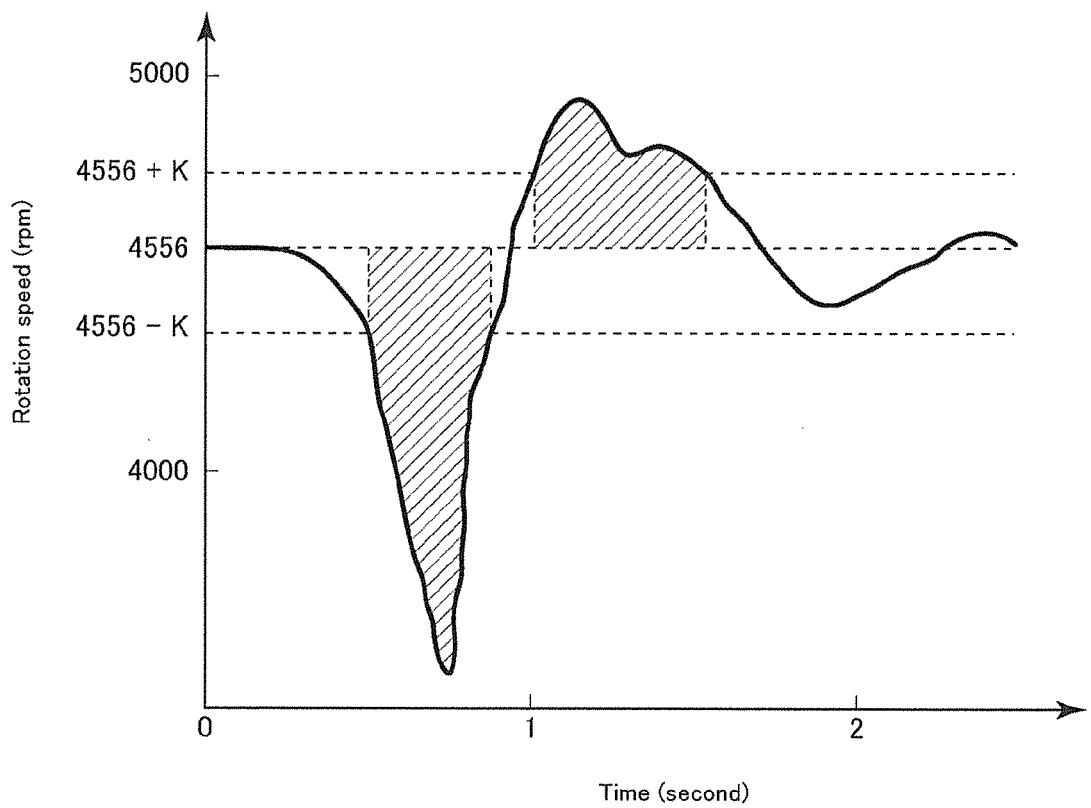
FIG. 15 is a graph showing another example of a change curve of a rotation speed and a standard line in the second embodiment.

In the same way as the first embodiment, the speed of the approach-run conveyor A may be made smaller than that of the weight-measurement conveyor B in the second embodiment. For example, 1657 revolutions per minute may be applied to the target rotation speed of the drive motor of the approach-run conveyor A (speed A), and 4556 revolutions per minute may be applied to the target rotation speed of the drive motor of the weight-measurement conveyor B (speed B). In this case, a change curve of the rotation speed is obtained as shown in FIG. 15, for example.

Also, the standard line may be a line representing the target rotation speed itself and further may be a line representing "a speed correlated to the target rotation speed".

Further, a modified area E may be used in addition to the area E itself. For example, as shown in FIG. 15, the change of rotation speed may be ignored as to the specific range of the target rotation speed (4556 revolutions per minute) plus/minus K (e.g. K=170 rpm) to adopt the area of the regions shown by the hatching in FIG. 15.

Also, in the second embodiment, weight of the transport object may be calculated based on two kinds of area E values obtained from a change curve of rotation speed by monitoring the number of rotation of motors of both conveyors. Further, weight of the transport object may be calculated by monitoring the number of rotation of motors of conveyor A instead of conveyor B and calculating the area E from the change curve of rotation speed of the approach-run conveyor A.

Another embodiment which includes both the first embodiment and the second embodiment is also applicable in the present invention. Specifically, weight of the transport object is sensed through both the amplitude of the fluctuation of the rotation speed and the area of regions obtained from the change curve of the rotation speed. In this case, two kinds of the weight values are obtained. Various ways are applicable for determining the desired weight finally. In an example, the average of both values is calculated. In another example, one is used as a main value and the other is used for modification. In the case that the two values are quite different from each other, the measurement may be determined to be an error.

In the above-described embodiments, the rotation speed of the motor is sensed by a Hall element incorporated in the motor itself, another way may be applicable in this invention. For example, the rotation speed may be sensed by an encoder installed in the motor. Further, the rotation speed of the roller body may be adopted as that of the motor.

Further, the rotation speed may be sensed indirectly by electric current value or the like to run to the motor.

In the above-described embodiments, the drive motor 12 for the approach-run conveyor A and the weight-measurement conveyor B is incorporated in the roller body 20 to form the motor-incorporating roller 5a. However, it is all right even if the drive motor 12 is not incorporated in the roller body 20 in the present invention. That is, the roller body 20 may be driven by the drive motor 12 which is set outside the roller body 20.

EXAMPLES

A conveyor 51 experimentally made by the inventors and experiments carried out by the inventors to confirm the effect of the present invention will be described below.

As with the conveyor 1 above-mentioned, the conveyor 51 has a carriage way composed of a plurality of zone conveyors. However, since the structure of a conveyor for the approach run differs from that of the other conveyors, the following description focuses on the differences.

Herein, since the structure of "the other conveyors" is the same as that of the zone conveyor 2 mentioned above, the following description is simplified by putting the same reference signs to common members.

As shown in FIG. 12, in the manufactured conveyor 51, the length of the approach-run conveyor α (alpha) in the conveying direction is larger than that of the other zone conveyors (including the weight-measurement conveyor β (beta)), and also the number of carriage rollers 5 in the conveyor α is larger than that in the other zone conveyors. Specifically, the approach-run conveyor α has side frames 53, 53 whose length is approximately twice as large as that of the other zone conveyors in the conveying direction, namely, that of frames 3, 3 in the other zone conveyors. In the conveyor α, fifteen carriage rollers 5 are axially supported between the side frames 53, 53. The fifteen carriage rollers 5 are axially supported at predetermined interval, which is the same interval in the other conveyors, in the conveying direction. The fifteen carriage rollers 5 are composed of a motor-incorporating roller 5a and fourteen driven rollers. Further, a presence sensor S is provided in the conveyor α near a downstream end on the conveying direction.

Then, experiments were carried out under the condition as shown in the following.

Example 1

In the conveyor 51, 4556 revolutions per minute (4556 rpm) was applied to the target rotation speed of the drive motor 12a of the approach-run conveyor α, and 3106 revolutions per minute (3106 rpm) was applied to the target rotation speed of the drive motor 12b of the weight-measurement conveyor β.

Transport objects with various weights (weight x, weight y, weight z) were carried by using the conveyor 51. An equal-sized pallet on which each of the transport objects placed was mounted on the conveyor.

Figure 16:
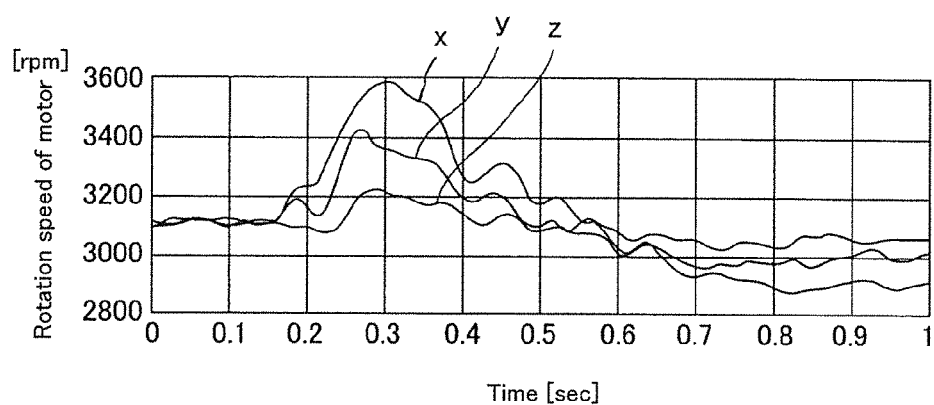
FIG. 16 is a graph showing a rotation speed of the drive motor of the conveyor for the weight measurement when a transport object was made to pass in the conveyor of FIG. 12 in Example 1.

The rotation speed of the drive motor 12b of the weight-measurement conveyor β was monitored. Then, the graph illustrated in FIG. 16 was obtained. In the graph, the respective curve represents weight x, weight y, or weight z in decreasing order of the amount of change.

The rotation speed of the drive motor 12b initially showed an increasing tendency with repeated up-and-down motions, and subsequently showed a decreasing tendency with repeated up-and-down motions.

Further, the period of the increasing tendency and the decreasing tendency was the same regardless of the weight of the transport object by this experiment. In this example, the frequency of the increasing tendency and the decreasing tendency was approximately 1 Hz.

Then, the rotation speed was subjected to Fourier transform to extract a low frequency element. More specifically, an element of 1 Hz was extracted. Subsequently, amplitude of the rotation speed change curve of the drive motor 12b is calculated. As a result, it was found that there was a linear correlation between the amplitude of rotation speed of the drive motor 12b and the weight of the transport object as shown in FIG. 17.

Figure 17:
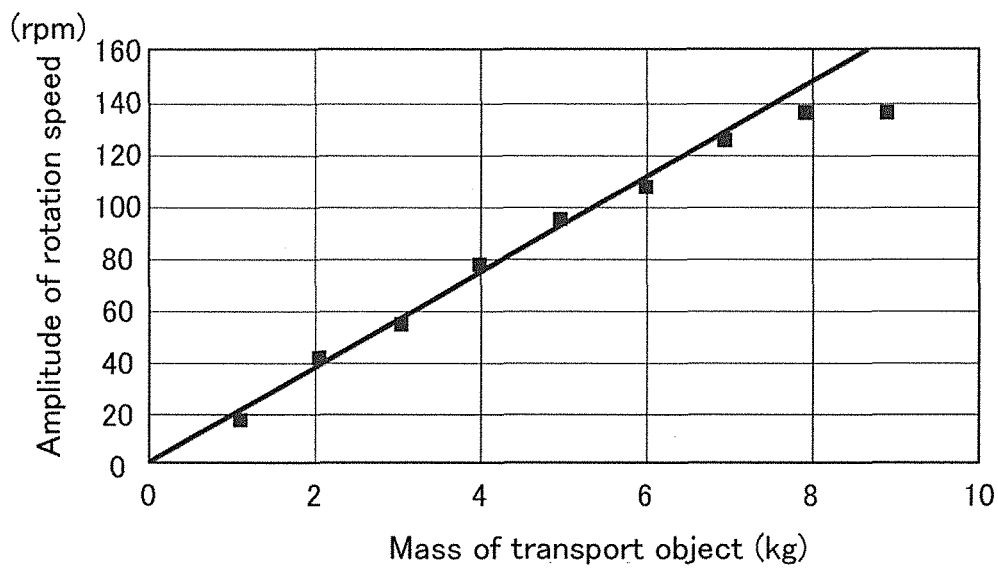
FIG. 17 is a graph showing a relation between weight of a transport object and amplitude of a change in a rotation speed of the drive motor in the conveyor for the weight measurement when the transport object is passed in the conveyor of FIG. 12 in Example 1.

Further, the following relation (1) was derived wherein "A" meant the amplitude of rotation speed of the drive motor 12b (amplitude A) and "B" meant the weight of the transport object as shown in FIG. 17.

$$M=0.0544A-0.0946 \tag{1}$$

Then, the relation (1) derived from FIG. 17 was memorized as data.

Subsequently, various transport objects whose weight is known were carried by using the conveyor to indicate their weight values on the indication device 32. As a result, the values on indication device 32 were accurate.

Example 2

On the same condition as Example 1, change curves of rotation speed of the motor were obtained in every mass of transport objects. In order to get rid of high frequency noises, low-pass filter was used for the measured data of rotation speed to get rid of data of more than 150 Hz. A standard line was drawn as shown in FIG. 14, and the area E, which is the sum of each area of the regions surrounded by the change curve and the standard line, was calculated. Modification of the area was done under the condition of K=170 rpm (see the hatching in FIG. 14). The range of mass of the transport objects were 1 to 20 kg with 1 kg increments (20 points).

Figure 18:
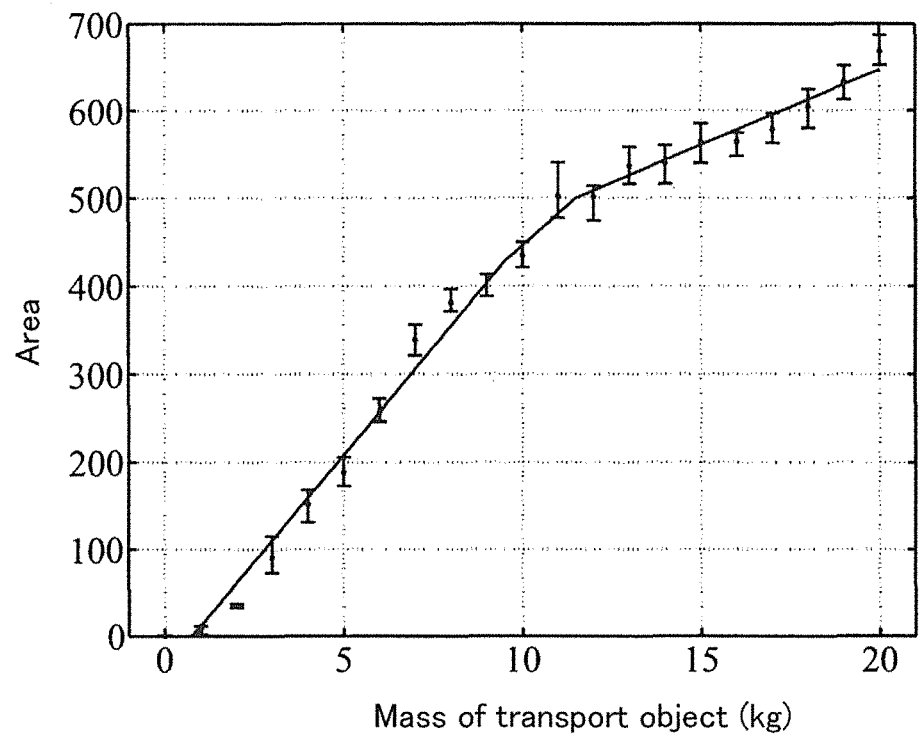
FIG. 18 is a graph obtained in Example 2 and showing a relation between area E and mass of the transport object.

As a result, the relation between the area E and mass of the transport objects was shown in FIG. 18. That is, linear correlations between the area E and mass of the transport objects were obtained in the ranges of 0 to 10 kg and 11 to 20 kg. The slope of the straight line in the range of 0 to 10 kg was different from that in the range of 11 to 20 kg. It was considered that the mode switched in the range of 10 to 11 kg.

The following relation (2) was derived in the range of 0 to 9 kg, the following relation (3) was derived in the range of 10 to 11 kg, and the following relation (4) was derived in the range of 12 to 20 kg:

$$M=0.0201E+0.8341 \tag{2}$$

$$M=0.0279E-2.4237 \tag{3}$$

$$M=0.0546E-15.577 \tag{4}$$

Example 3

In this Example, the target rotation speed of the drive motor 12a of the approach-run conveyor α was smaller than that of the drive motor 12b of the weight-measurement conveyor β. Specifically, 1657 revolutions per minute (1657 rpm) was applied to the target rotation speed of the drive motor 12a of the conveyor α, and 4556 revolutions per minute (4556 rpm) was applied to the target rotation speed of the drive motor 12b of the conveyor β, and then an experiment was carried out according to Example 1. The range of mass of the transport objects were 1 to 20 kg with 1 kg increments (20 points). A rubber was wound around all the rollers for antiskid.

Figure 19:
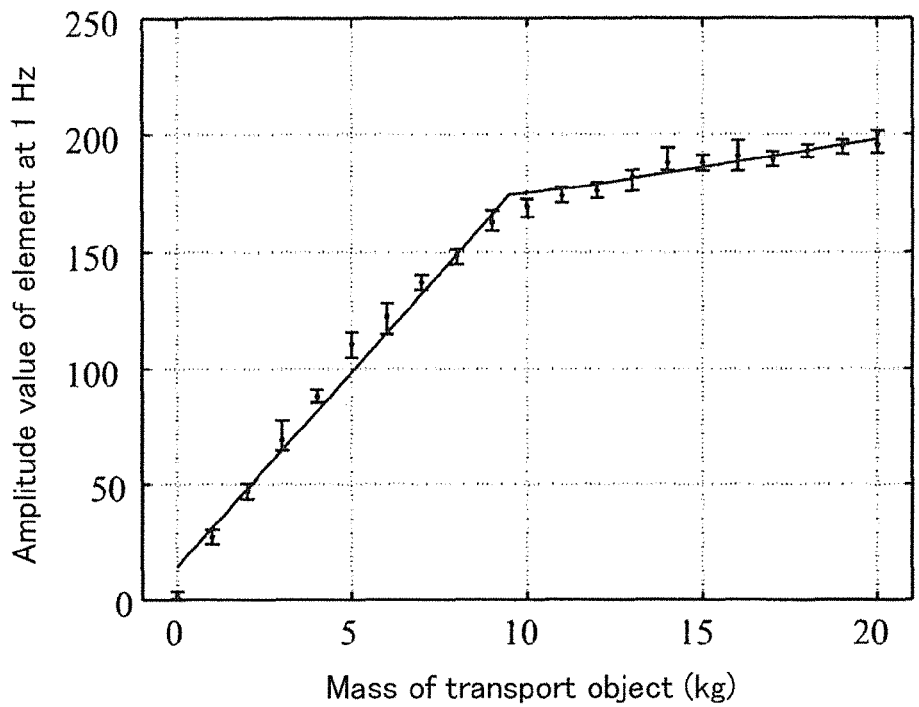
FIG. 19 is a graph obtained in Example 3 and showing a relation between amplitude values of an element at 1 Hz and mass of the transport object.

FIG. 19 shows a relation between amplitude values A of an element at 1 Hz and mass M of a transport object. That is, linear correlations between the amplitude values A and the mass M were obtained in the ranges of 0 to 9 kg and 12 to 20 kg. The slope of the straight line in the range of 0 to 9 kg was different from that in the range of 12 to 20 kg. It was considered that the mode switched in the range of 10 to 11 kg.

The following relation (5) was derived in the range of 0 to 9 kg, the following relation (6) was derived in the range of 10 to 11 kg, and the following relation (7) was derived in the range of 12 to 20 kg:

$$M=0.0581A-0.7159 \quad (5)$$

$$M=0.6201A-98.649 \quad (6)$$

$$M=0.3791A-55.47 \quad (7)$$

Figure 20:
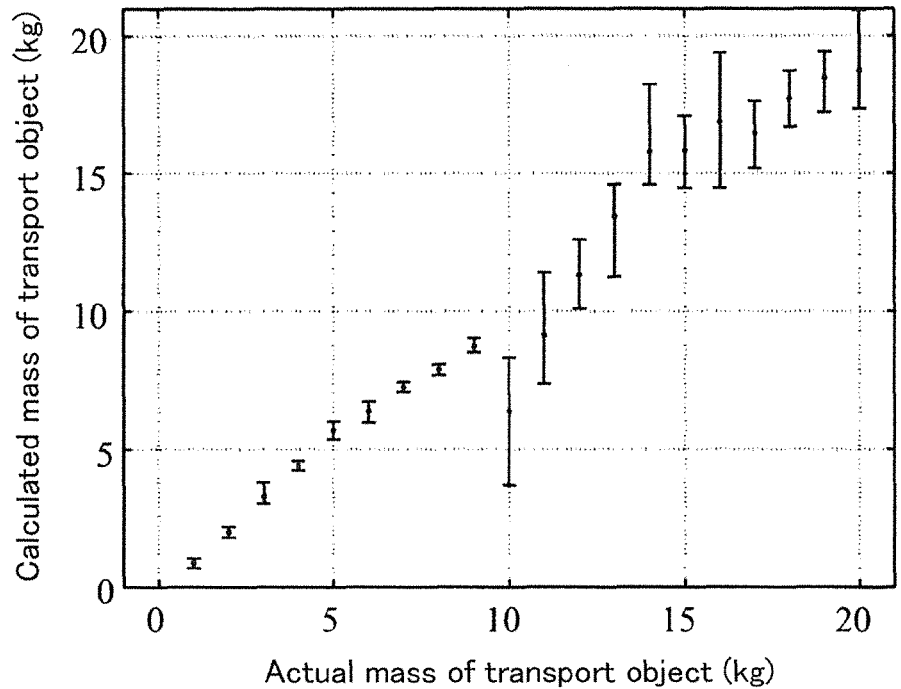
FIG. 20 is a graph obtained in Example 3 and showing a relation between actual mass and calculated mass of the transport object.

FIG. 20 shows a relation between actual mass and calculated mass of the transport objects. A good correlation was found between both values.

Example 4

On the same condition as Example 3, change curves of rotation speed of the motor were obtained in every mass of transport objects. A standard line was drawn as shown in FIG. 15, and the area E, which is the sum of each area of the regions surrounded by the change curve and the standard line, was calculated. Modification of the area was done under the condition of K=170 rpm (see the hatching in FIG. 15). The range of mass of the transport objects were 1 to 20 kg with 1 kg increments (20 points).

Figure 21:
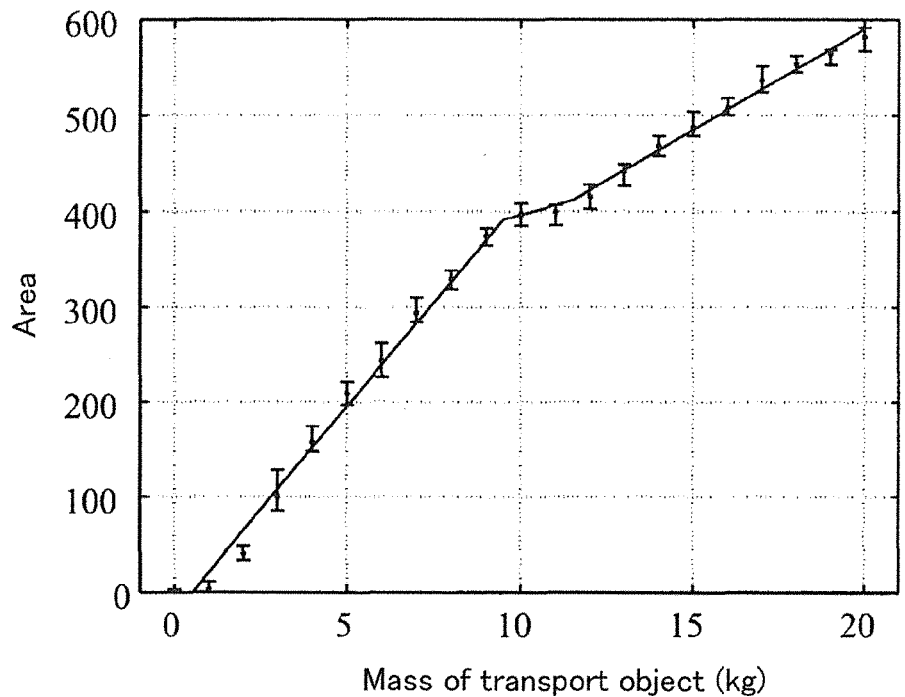
FIG. 21 is a graph obtained in Example 4 and showing a relation between area E and mass of the transport object.

As a result, the relation between the area E and mass of the transport objects was shown in FIG. 21. That is, linear correlations between the area E and mass of the transport objects were obtained in the ranges of 0 to 9 kg and 12 to 20 kg. The slope of the straight line in the range of 0 to 9 kg was different from that in the range of 12 to 20 kg. It was considered that the mode switched in the range of 10 to 11 kg.

The following relation (8) was derived in the range of 0 to 9 kg, the following relation (9) was derived in the range of 10 to 11 kg, and the following relation (10) was derived in the range of 12 to 20 kg:

$$M=0.0226A-0.5779 \quad (8)$$

$$M=0.1023A-30.582 \quad (9)$$

$$M=0.0471A-7.8504 \quad (10)$$

Figure 22:
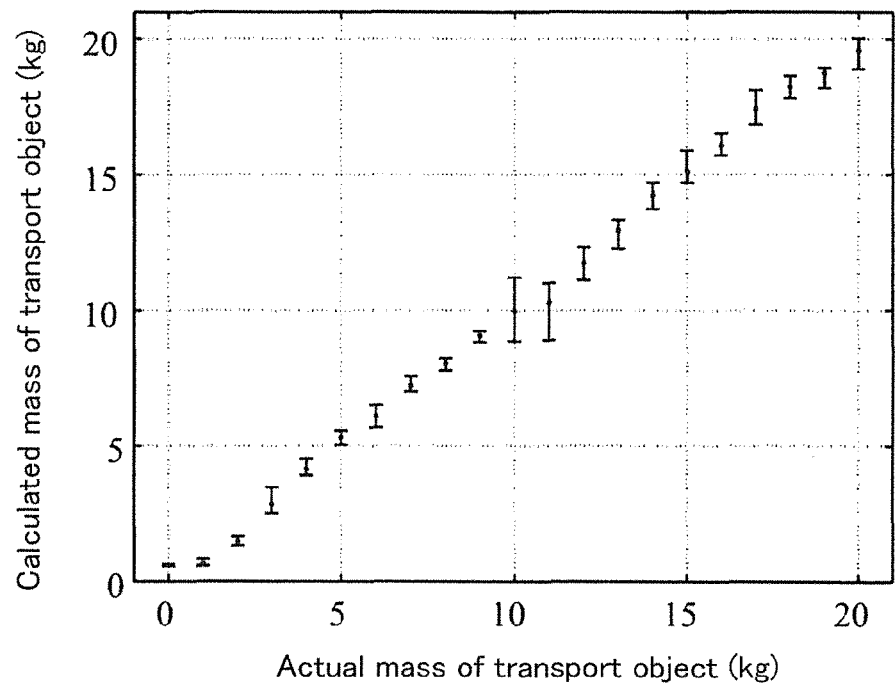
FIG. 22 is a graph obtained in Example 4 and showing a relation between actual mass and calculated mass of a transport object.

FIG. 22 shows a relation between actual mass and calculated mass of the transport objects. A good correlation was found between both values.

INDUSTRIAL APPLICABILITY

Since the conveyor of the present invention has a weight measurement function which measures weight of a transport object in parallel with conveying the transport object, it is possible to prevent or detect an error in conveying the transport object based on weight of the transport object. Further, since members such as a sensor to add the weight measurement function do not need to be provided, extra carriage steps are not necessary in the case of sorting transport objects automatically. Further, from the comparison between actual weight of the transport object and weight calculated from the relation (1) or the like, it is also possible to detect a failure or an abnormality of the conveyor.

REFERENCE SIGNS LIST 1, 51 conveyor
2 zone conveyor
5 carriage roller
10 zone controller
12 drive motor
30 weight sensing device
32 indication device
33 Hall element signal input circuit
35 pulse generating circuit
36 rotation speed operation program
37 Fourier transform program
38 weight calculation program
A, α conveyor for the approach run (approach-run conveyor)
B, β conveyor for the weight measurement (weight-measurement conveyor)
G, O, P Hall element
Va total amplitude
E area

The invention claimed is:

1. A conveyor for forming a series of carriage ways and comprising:
   a first zone driven by a motor and a second zone adjacent to the first zone and driven by another motor,
   the motor of the first zone being controlled so that its rotation speed becomes a constant rotation speed, while the motor of the second zone being controlled so that its rotation speed becomes another constant rotation speed different from that of the first zone,
   further comprising a rotation speed sensing means to monitor directly or indirectly the rotation speed of either (A) a motor of at least one of the zones or (B) a member that rotates with the motor, and
   further comprising a weight sensing means to sense weight of a transport object based on fluctuation of the rotation speed of one of the motors when the transport object is moved from one zone to the other zone.

2. The conveyor according to claim 1, wherein weight of the transport object is sensed through the amplitude of the fluctuation of the rotation speed.

3. The conveyor according to claim 1, wherein a low frequency fluctuation of the rotation speed is sensed so that weight of the transport object is sensed through the amplitude in the low frequency fluctuation.

4. The conveyor according to claim 2, wherein the amplitude is calculated by approximation of the fluctuation in the rotation speed to a wave having a constant frequency.

5. The conveyor according to claim 4, wherein the approximation is done by Fourier transform.

6. The conveyor according to claim 1, wherein weight of the transport object is sensed through area of a region surrounded by (A) a curve that represents a time history of the rotating speed and (B) a line that represents a target rotation speed or a speed correlated to the target rotation speed.

7. The conveyor according to claim 2, wherein weight of the transport object is sensed through area of a region surrounded by (A) a curve that represents a time history of the rotating speed and (B) a line that represents a target rotation speed or a speed correlated to the target rotation speed.

8. The conveyor according to claim 1, further comprising a transform relation memory that memorizes relation between the weight of the transport object and the amplitude of the fluctuation of the rotation speed or the area of the region, and wherein the conveyor senses the weight of the transport object, based on (A) an actually sensed value monitored by the rotation speed sensing means when the transport object is moved from one zone to the other zone and (B) the relation memorized in the transform relation memory.

9. The conveyor according to claim 1, further comprising a timing sensing means to sense a timing for the transport object to be moved from one zone to the other zone.

10. The conveyor according to claim 1, wherein the motor is a brushless motor having a rotation position sensing means to sense a position of a rotor and wherein the rotation speed sensing means monitors the rotation speed of the motor based on a sensing signal of the rotation position sensing means.

11. The conveyor according to claim 10, wherein the rotation position sensing means comprises a plurality of Hall elements provided in the motor, wherein time interval of a position sensing signal of each of the Hall elements is sensed, and wherein the rotation speed of the motor is monitored based on the time interval.

12. The conveyor according to claim 1, wherein difference between a target rotation speed of the first zone and a target rotation speed of the second zone is more than 30% (percent) of a lower target rotation speed of the two target rotation speeds.

13. A weight sensing method using a conveyor and for sensing weight of a transport object mounted on the conveyor, comprising the steps of:
   dividing the conveyor into a first zone driven by a motor and a second zone adjacent to the first zone and driven by another motor,
   controlling the motor of the first zone so that its rotation speed becomes a constant rotation speed,
   controlling the motor of the second zone so that its rotation speed becomes another constant rotation speed different from that of the first zone,
   moving the transport object from one zone to the other zone,
   monitoring fluctuation of the rotation speed of a motor of at least one of the zones during the move,
   sensing low-frequency fluctuation of the rotation speed, and
   obtaining weight of the transport object based on amplitude of the low-frequency fluctuation.

14. The weight sensing method according to claim 13, wherein the amplitude is calculated by approximation of the fluctuation in the rotation speed to a wave having a constant frequency.

15. The weight sensing method according to claim 14, wherein the approximation is done by Fourier transform.

16. The weight sensing method according to claim 13, further comprising the steps of:
   monitoring fluctuation of the rotation speed of the motor so as to obtain a curve that represents a time history of the rotating speed, and
   obtaining weight of the transport object based on area of a region surrounded by the curve and a line that represents a target rotation speed or a speed correlated to the target rotation speed.

17. A weight sensing method using a conveyor and for sensing weight of a transport object mounted on the conveyor, comprising the steps of:
   dividing the conveyor into a first zone driven by a motor and a second zone adjacent to the first zone and driven by another motor,
   controlling the motor of the first zone so that its rotation speed becomes a constant rotation speed,
   controlling the motor of the second zone so that its rotation speed becomes another constant rotation speed different from that of the first zone,
   moving the transport object from one zone to the other zone,
   monitoring fluctuation of the rotation speed of a motor of at least one of the zones during the move so as to obtain a curve that represents a time history of the rotating speed, and
   obtaining weight of the transport object based on area of a region surrounded by the curve and a line that represents a target rotation speed or a speed correlated to the target rotation speed.

\* \* \* \* \*